United States Patent
Chassin et al.

(10) Patent No.: US 9,342,850 B2
(45) Date of Patent: May 17, 2016

(54) FORWARD-LOOKING TRANSACTIVE PRICING SCHEMES FOR USE IN A MARKET-BASED RESOURCE ALLOCATION SYSTEM

(71) Applicant: Battelle Memorial Institute, Richland, WA (US)

(72) Inventors: David P. Chassin, Pasco, WA (US); Jason C. Fuller, Richland, WA (US); Robert G. Pratt, Kennewick, WA (US); Nirupama Prakash Kumar, Richland, WA (US); Andrew R. Fisher, Sunnyside, WA (US)

(73) Assignee: Battelle Memorial Institute, Richland, WA (US)

( * ) Notice: Subject to any disclaimer, the term of this patent is extended or adjusted under 35 U.S.C. 154(b) by 343 days.

(21) Appl. No.: 13/846,647

(22) Filed: Mar. 18, 2013

(65) Prior Publication Data

US 2013/0254090 A1    Sep. 26, 2013

Related U.S. Application Data

(62) Division of application No. 13/096,682, filed on Apr. 28, 2011, now Pat. No. 9,245,297.

(51) Int. Cl.
| | | |
|---|---|---|
| *G06Q 40/00* | (2012.01) | |
| *G06Q 40/04* | (2012.01) | |
| *G06Q 30/08* | (2012.01) | |

(52) U.S. Cl.
CPC ............... *G06Q 40/04* (2013.01); *G06Q 30/08* (2013.01); *G06Q 40/00* (2013.01)

(58) Field of Classification Search
None
See application file for complete search history.

(56) References Cited

U.S. PATENT DOCUMENTS

| 4,010,614 A * | 3/1977 | Arthur ....................... 60/641.15 |
| 5,572,438 A | 11/1996 | Ehlers et al. |

(Continued)

FOREIGN PATENT DOCUMENTS

| CA | 2678828 | 3/2010 |
| JP | 2008-204073 | 9/2008 |

(Continued)

OTHER PUBLICATIONS

Boyd et al., "Load Reduction, Demand Response, and Energy Efficient Technologies and Strategies," Pacific Northwest National Laboratory PNNL-18111, 44 pp. (Nov. 2008).

(Continued)

*Primary Examiner* — Rajesh Khattar
(74) *Attorney, Agent, or Firm* — Klarquist Sparkman, LLP

(57) ABSTRACT

Disclosed herein are representative embodiments of methods, apparatus, and systems for distributing a resource (such as electricity) using a resource allocation system. One of the disclosed embodiments is a method for generating a bid value for purchasing electricity in a market-based resource allocation system. In this embodiment, a desired performance value indicative of a user's desired performance level for an electrical device is received. Price information from an electricity futures market is received. A bid value for purchasing electricity from a local resource allocation market sufficient to operate the electrical device at the desired performance level is computed. In this embodiment, the computing is performed based at least in part on the desired performance value and based at least in part on the price information from the electricity futures market.

17 Claims, 18 Drawing Sheets

(56) References Cited

U.S. PATENT DOCUMENTS

| | | | |
|---|---|---|---|
| 5,684,710 A | 11/1997 | Ehlers et al. | |
| 5,696,695 A | 12/1997 | Ehlers et al. | |
| 5,924,486 A | 7/1999 | Ehlers et al. | |
| 6,216,956 B1 | 4/2001 | Ehlers et al. | |
| 6,343,277 B1 | 1/2002 | Gaus et al. | |
| 6,633,823 B2 | 10/2003 | Bartone et al. | |
| 6,681,156 B1 | 1/2004 | Weiss | |
| 6,895,325 B1 * | 5/2005 | Munson, Jr. | 701/100 |
| 6,963,854 B1 | 11/2005 | Boyd et al. | |
| 7,043,380 B2 | 5/2006 | Rodenberg et al. | |
| 7,085,739 B1 | 8/2006 | Winter et al. | |
| 7,130,719 B2 | 10/2006 | Ehlers et al. | |
| 7,135,956 B2 | 11/2006 | Bartone et al. | |
| 7,141,321 B2 | 11/2006 | McArthur et al. | |
| 7,243,044 B2 | 7/2007 | McCalla | |
| 7,249,169 B2 | 7/2007 | Blouin et al. | |
| 7,343,226 B2 | 3/2008 | Ehlers et al. | |
| 7,343,360 B1 | 3/2008 | Ristanovic et al. | |
| 7,379,997 B2 | 5/2008 | Ehlers et al. | |
| 7,418,428 B2 | 8/2008 | Ehlers et al. | |
| 7,516,106 B2 | 4/2009 | Ehlers et al. | |
| 7,599,866 B2 | 10/2009 | Yan et al. | |
| 7,716,101 B2 | 5/2010 | Sandholm et al. | |
| 7,953,519 B2 | 5/2011 | Hamilton, II et al. | |
| 7,996,296 B2 | 8/2011 | Lange | |
| 8,126,794 B2 | 2/2012 | Lange et al. | |
| 8,271,345 B1 | 9/2012 | Milgrom et al. | |
| 8,504,463 B2 | 8/2013 | Johnson et al. | |
| 8,527,389 B2 | 9/2013 | Johnson et al. | |
| 8,577,778 B2 | 11/2013 | Lange et al. | |
| 2001/0032029 A1 | 10/2001 | Kauffman | |
| 2002/0038279 A1 | 3/2002 | Samuelson et al. | |
| 2002/0091626 A1 | 7/2002 | Johnson et al. | |
| 2002/0128747 A1 | 9/2002 | Mima | |
| 2002/0132144 A1 * | 9/2002 | McArthur et al. | 429/13 |
| 2002/0178047 A1 | 11/2002 | Or et al. | |
| 2003/0014379 A1 | 1/2003 | Saias et al. | |
| 2003/0023540 A2 | 1/2003 | Johnson et al. | |
| 2003/0036820 A1 | 2/2003 | Yellepeddy et al. | |
| 2003/0040844 A1 | 2/2003 | Spool et al. | |
| 2003/0040845 A1 | 2/2003 | Spool et al. | |
| 2003/0041002 A1 * | 2/2003 | Hao et al. | 705/37 |
| 2003/0041016 A1 | 2/2003 | Spool et al. | |
| 2003/0041017 A1 | 2/2003 | Spool et al. | |
| 2003/0055774 A1 * | 3/2003 | Ginsberg | 705/37 |
| 2003/0078797 A1 | 4/2003 | Kanbara et al. | |
| 2003/0093332 A1 | 5/2003 | Spool et al. | |
| 2003/0093357 A1 | 5/2003 | Guler et al. | |
| 2003/0139939 A1 | 7/2003 | Spool et al. | |
| 2003/0144864 A1 | 7/2003 | Mazzarella | |
| 2003/0149672 A1 | 8/2003 | Laskoski | |
| 2003/0216971 A1 | 11/2003 | Sick et al. | |
| 2004/0010478 A1 | 1/2004 | Peljto et al. | |
| 2004/0015428 A2 | 1/2004 | Johnson et al. | |
| 2004/0024483 A1 | 2/2004 | Holcombe | |
| 2004/0128266 A1 | 7/2004 | Yellepeddy et al. | |
| 2004/0133529 A1 | 7/2004 | Munster | |
| 2004/0140908 A1 | 7/2004 | Gladwin et al. | |
| 2004/0153330 A1 | 8/2004 | Miller et al. | |
| 2004/0254688 A1 | 12/2004 | Chassin et al. | |
| 2005/0015283 A1 | 1/2005 | Iino et al. | |
| 2005/0027636 A1 | 2/2005 | Gilbert et al. | |
| 2005/0065867 A1 | 3/2005 | Aisu et al. | |
| 2005/0114255 A1 | 5/2005 | Shields et al. | |
| 2005/0125243 A1 | 6/2005 | Villalobos | |
| 2005/0137959 A1 | 6/2005 | Yan et al. | |
| 2005/0197875 A1 | 9/2005 | Kauffman | |
| 2005/0228553 A1 | 10/2005 | Tryon | |
| 2006/0036357 A1 | 2/2006 | Isono et al. | |
| 2006/0241951 A1 | 10/2006 | Cynamom et al. | |
| 2006/0259199 A1 | 11/2006 | Gjerde et al. | |
| 2006/0293980 A1 | 12/2006 | Corby et al. | |
| 2007/0011080 A1 | 1/2007 | Jain et al. | |
| 2007/0061248 A1 | 3/2007 | Shavit et al. | |
| 2007/0087756 A1 | 4/2007 | Hoffberg | |
| 2007/0124026 A1 | 5/2007 | Troxell et al. | |
| 2008/0021628 A1 | 1/2008 | Tryon | |
| 2008/0027639 A1 | 1/2008 | Tryon | |
| 2008/0039980 A1 | 2/2008 | Pollack et al. | |
| 2008/0046387 A1 | 2/2008 | Gopal et al. | |
| 2008/0051977 A1 | 2/2008 | Tryon | |
| 2008/0243664 A1 | 10/2008 | Shavit et al. | |
| 2008/0243682 A1 | 10/2008 | Shavit et al. | |
| 2008/0243719 A1 | 10/2008 | Shavit et al. | |
| 2008/0281663 A1 | 11/2008 | Hakim | |
| 2008/0297113 A1 | 12/2008 | Saeki et al. | |
| 2008/0300907 A1 | 12/2008 | Musier et al. | |
| 2008/0300935 A1 | 12/2008 | Musier et al. | |
| 2008/0306801 A1 | 12/2008 | Musier et al. | |
| 2008/0319893 A1 | 12/2008 | Mashinsky et al. | |
| 2009/0063228 A1 * | 3/2009 | Forbes, Jr. | 705/7 |
| 2009/0132360 A1 | 5/2009 | Arfin et al. | |
| 2009/0177591 A1 | 7/2009 | Thorpe et al. | |
| 2009/0195349 A1 | 8/2009 | Frader-Thompson et al. | |
| 2009/0228151 A1 * | 9/2009 | Wang et al. | 700/278 |
| 2009/0307059 A1 | 12/2009 | Young et al. | |
| 2009/0313174 A1 | 12/2009 | Hafner et al. | |
| 2010/0010939 A1 | 1/2010 | Arfin et al. | |
| 2010/0049371 A1 | 2/2010 | Martin | |
| 2010/0057625 A1 | 3/2010 | Boss et al. | |
| 2010/0106332 A1 * | 4/2010 | Chassin et al. | 700/278 |
| 2010/0106641 A1 | 4/2010 | Chassin et al. | |
| 2010/0107173 A1 | 4/2010 | Chassin | |
| 2010/0114387 A1 | 5/2010 | Chassin | |
| 2010/0121700 A1 | 5/2010 | Wigder et al. | |
| 2010/0179862 A1 | 7/2010 | Pratt et al. | |
| 2010/0216545 A1 | 8/2010 | Lange et al. | |
| 2010/0217550 A1 | 8/2010 | Crabtree et al. | |
| 2010/0218108 A1 | 8/2010 | Crabtree et al. | |
| 2010/0256999 A1 | 10/2010 | Ghani et al. | |
| 2010/0332373 A1 * | 12/2010 | Crabtree et al. | 705/37 |
| 2011/0015801 A1 | 1/2011 | Mazzarella | |
| 2011/0016055 A1 | 1/2011 | Mazzarella | |
| 2011/0081955 A1 | 4/2011 | Lange et al. | |
| 2011/0301964 A1 | 12/2011 | Conwell | |
| 2012/0022995 A1 | 1/2012 | Lange | |
| 2012/0083930 A1 * | 4/2012 | Ilic et al. | 700/287 |
| 2013/0325691 A1 | 12/2013 | Chassin et al. | |
| 2013/0325692 A1 | 12/2013 | Chassin et al. | |

FOREIGN PATENT DOCUMENTS

| | | |
|---|---|---|
| WO | WO 99/01822 | 1/1999 |
| WO | WO 02/23693 | 3/2002 |
| WO | WO 2007/065135 | 6/2007 |

OTHER PUBLICATIONS

Brambley, "Thinking Ahead: Autonomic Buildings," *ACEEE Summer Study on the Energy Efficiency in Buildings*, vol. 7, pp. 73-86 (2002).

Chandley, "How RTOs Set Spot Market Prices (and How It Helps Keep the Lights On)," *PJM Interconnection*, 23 pp. (Sep. 2007).

Chassin et al., "Decentralized Coordination through Digital Technology, Dynamic Pricing, and Customer-Driven Control: The GridWise Testbed Demonstration Project," *The Electricity Journal*, vol. 21, pp. 51-59 (Oct. 2008).

Chassin et al., "Gauss-Seidel Accelerated: Implementing Flow Solvers on Field Programmable Gate Arrays," *IEEE Power Engineering Society General Meeting*, 5 pp. (Jun. 2006).

Chassin et al., "GridLAB-D: An open-source power systems modeling and simulation environment," *IEEE*, 5 pp. (Apr. 2008).

Chassin, "GridLAB-D Technical Support Document: Tape Modules Version 1.0," Pacific Northwest National Laboratory PNNL-17614, 8 pp. (May 2008).

Chassin, "GridLAB-D Technical Support Document: Commercial Modules Version 1.0," Pacific Northwest National Laboratory PNNL-17615, 8 pp. (May 2008).

Chassin, "GridLAB-D Technical Support Document: Network Module Version 1.0," Pacific Northwest National Laboratory PNNL-17616, 10 pp. (May 2008).

(56) References Cited

OTHER PUBLICATIONS

Chassin et al., "Modeling Power Systems as Complex Adaptive Systems," Pacific Northwest National Laboratory PNNL-14987, 151 pp. (Dec. 2004).
Chassin et al., "Project 2.6—Enhancement of the Whole-Building Diagnostician," Pacific Northwest National Laboratory PNNL-14383, 17 pp. (Aug. 2003).
Chassin, "The Abstract Machine Model for Transaction-based System Control," Pacific Northwest National Laboratory PNNL-14082, 28 pp. (Nov. 2002).
Chassin et al., "The pacific northwest demand response market demonstration," *IEEE*, 6 pp. (Jul. 2008).
Chen et al., "The Influence of Topology Changes on Inter-area Oscillation Modes and Mode Shapes," *IEEE Power and Energy Society General Meeting*, 7 pp. (Jul. 2011).
Clearwater et al., "Thermal Markets for Controlling Building Environments," *Energy Engineering*, vol. 91, No. 3, pp. 26-56 (1994).
Diao et al., "Deriving Optimal Operational Rules for Mitigating Inter-area Oscillations," *IEEE/PES Power Systems Conference & Exposition*, 8 pp. (Mar. 2011).
Fernandez et al., "Self Correcting HVAC Controls: Algorithms for Sensors and Dampers in Air-Handling Units," Pacific Northwest Laboratory PNNL-19104, 49 pp. (Dec. 2009).
Fuller et al., "Analysis of Residential Demand Response and Double-Auction Markets," *IEEE Power and Energy Society General Meeting*, 7 pp. (Jul. 2011).
Fuller et al., "Evaluation of Representative Smart Grid Investment Grant Project Technologies: Demand Response," Pacific Northwest National Laboratory PNNL-20772, 349 pp. (Feb. 2012).
Fuller et al., "Modeling of GE Appliances in GridLAB-D: Peak Demand Reduction," Pacific Northwest National Laboratory PNNL-21358, 157 pp. (Apr. 2012).
Gatterbauer, "Interdependencies of Electricity Market Characteristics and Bidding Strategies of Power Producers," Master's Thesis, Massachusetts Institute of Technology, 33 pp. (May 2002).
Georgilakis, "Market Clearing Price Forecasting in Deregulated Electricity Markets Using Adaptively Trained Neural Networks," *Hellenic Conference on Artificial Intelligence*, vol. 3955, pp. 56-66 (2006).
Guttromson et al., "Residential energy resource models for distribution feeder simulation," *IEEE*, vol. 1, pp. 108-113 (Jul. 2003).
Hammerstrom et al., "Pacific Northwest GridWise Testbed Demonstration Projects: Part I. Olympic Peninsula Project," Pacific Northwest National Laboratory PNNL-17167, 157 pp. (Oct. 2007).
Hammerstrom et al., "Pacific Northwest GridWise Testbed demonstration Projects: Part II. Grid Friendly Appliance Project," Pacific Northwest National Laboratory PNNL-17079, 123 pp. (Oct. 2007).
Hammerstrom et al., "Standardization of a Hierarchical Transactive Control System," *Grid Interop Conf.*, 7 pp. (Nov. 2009).
Hatley et al., "Energy Management and Control System: Desired Capabilities and Functionality," Pacific Northwest National Laboratory PNNL-15074, 46 pp. (Apr. 2005).
Huang et al., "MANGO—Modal Analysis for Grid Operation: A Method for Damping Improvement through Operating Point Adjustment," Pacific Northwest National Laboratory PNNL-19890, 92 pp. (Oct. 2010).
Huang et al., "Transforming Power Grid Operations," *Scientific Computing*, vol. 45, No. 5, pp. 22-27 (Apr. 2007).
International Search Report dated Nov. 28, 2012, from International Patent Application No. PCT/US2012/034559, 3 pp.
Kannberg et al., "GridWise: The Benefits of a Transformed Energy System," Pacific Northwest National Laboratory PNNL-14396, 48 pp. (Sep. 2003).
Katipamula et al., "Evaluation of Residential HVAC Control Strategies for Demand Response Programs," *ASHRAE Trans., Symp. on Demand Response Strategies for Building Systems*, 12 pp (Jan. 2006).
Katipamula et al., "Transactive Controls: A Market-Based GridWise Controls for Building Systems," Pacific Northwest National Laboratory PNNL-15921, 14 pp. (Jul. 2006).

Kiesling, "Retail Electricity Deregulation: Prospects and Challenges for Dynamic Pricing and Enabling Technologies," The Searle Center Annual Review of Regulation, 44 pp. (May 2007).
Kintner-Meyer et al., "Final Report for the Energy Efficient and Affordable Small Commercial and Residential Buildings Research Program—Project 3.3—Smart Load Control and Grid Friendly Appliances," Pacific Northwest National Laboratory PNNL-14342, 147 pp. (Jul. 2003).
Kok et al., "Agent-based Electricity Balancing with Distributed Energy Resources, A Multiperspective Case Study," *Proc. Hawaii Int'l Conf. on System Sciences*, 10 pp. (Jan. 2008).
Kok et al., "PowerMatcher: Multiagent Control in the Electricity Infrastructure," *AAMAS*, 8 pp. (Jul. 2005).
LeMay et al., "An Integrated Architecture for Demand Response Communications and Control," *Hawaii Int'l Conf. on System Sciences*, 10 pp. (Jan. 2008).
Lu et al., "A State-Queueing Model of Thermostatically Controlled Appliances," *IEEE Trans. on Power Systems*, vol. 19, No. 3, pp. 1666-1673 (Aug. 2004).
Lu et al., "Control Strategies of Thermostatically Controlled Appliances in a Competitive Electricity Market," *IEEE Proc. Power Engineering Society General Meeting*, pp. 202-207 (Jun. 2005).
Lu et al., "Design Considerations for Frequency Responsive Grid Friendly Appliances," *IEEE PES Trans. and Distribution Conference and Exhibition*, 6 pp. (May 2006).
Lu et al., "Grid Friendly Device Model Development and Simulation," Pacific Northwest National Laboratory PNNL-18998, 52 pp. (Nov. 2009).
Lu et al., "Modeling Uncertainties in Aggregated Thermostatically Controlled Loads Using a State Queueing Model," *IEEE Trans. on Power Systems*, vol. 20, No. 2, pp. 725-733 (May 2005).
Lu et al., "Simulating Price Responsive Distributed Resources," *IEEE*, vol. 3, pp. 1538-1543 (Oct. 2004).
Nicolaisen et al., "Market Power and Efficiency in a Computational Electricity Market With Discriminatory Double-Auction Pricing," ISU Economic Report No. 52, 26 pp. (Aug. 27, 2000; revised Aug. 24, 2001).
Pourebrahimi et al., "Market-based Resource Allocation in Grids," *IEEE Int'l Conf. on e-Science and Grid Computing*, 8 pp. (2006).
Pratt et al., "Potential Impacts of High Penetration of Plug-in Hybrid Vehicles on the U.S. Power Grid," DOE/EERE PHEV Stakeholder Workshop, 14 pp. (Jun. 2007).
Schneider et al., "A Taxonomy of North American Radial Distribution Feeders," *IEEE Power & Energy Society General Meeting*, 6 pp. (Jul. 2009).
Schneider et al., "Analysis of Distribution Level Residential Demand Response," *IEEE/PES Power System Conference and Exposition*, 6 pp. (Mar. 2011).
Schneider et al., "Detailed End Use Load Modeling for Distribution System Analysis," *IEEE Power and Energy Society General Meeting*, 7 pp. (Jul. 2010).
Schneider et al., "Distribution Power Flow for Smart Grid Technologies," *IEEE/PES Power System Conference and Exhibition*, 7 pp. (Mar. 2009).
Schneider et al., "Evaluation of Conservation Voltage Reduction (CVR) on a National Level," Pacific Northwest National Laboratory PNNL-19596, 114 pp. (Jul. 2010).
Schneider et al., "Modern Grid Strategy: Enhanced GridLAB-D Capabilities Final Report," Pacific Northwest National Laboratory PNNL-18864, 30 pp. (Sep. 2009).
Schneider et al., "Multi-State Load Models for Distribution System Analysis," *IEEE Trans. on Power Systems*, vol. 26, No. 4, pp. 2425-2433 (Nov. 2011).
Schneider et al., "Voltage Control Devices on the IEEE 8500 Node Test Feeder," *IEEE PES Transmission & Distribution Conference & Exposition*, 6 pp. (Apr. 2010).
Singh et al., "Effects of Distributed Energy Resources on Conservation Voltage Reduction (CVR)," *IEEE Power and Energy Society General Meeting*, 7 pp. (Jul. 2011).
Taylor et al., "GridLAB-D Technical Support Document: Residential End-Use Module Version 1.0," Pacific Northwest National Laboratory PNNL-17694, 30 pp. (Jul. 2008).

(56) References Cited

OTHER PUBLICATIONS

Widergren et al., "Residential Real-time Price Response Simulation," *IEEE Power and Energy Society General Meeting*, pp. 3074-3078 (Jul. 2011).

Written Opinion dated Nov. 28, 2012, from International Patent Application No. PCT/US2012/034559, 5 pp.

Borenstein et al., "Diagnosing Market Power in California's Deregulated Wholesale Electricity Market," University of California Energy Institute, Power, PWP-064, 54 pp. (Aug. 2000).

Borenstein et al., "Diagnosing Market Power in California's Deregulated Wholesale Electricity Market," University of California Energy Institute, Power, PWP-064, 52 pp. (Mar. 2000).

Chassin, "Statistical Mechanics: A Possible Model for Market-based Electric Power Control", *Proc. of the 37th Hawaii Int'l Conf. on System Sciences*, 10 pp. (Janury 2004).

Denholm et al., "An Evaluation of Utility System Impacts and Benefits of Optimally Dispatched Plug-In Hybrid Electric Vehicles," NREL Technical Report NREL/TP-620-40293, 30 pp. (Oct. 2006).

Denton et al., "Spot Market Mechanism Design and Competitivity Issues in Electric Power", *Proc. of the 31st Hawaii International Conference on System Sciences*, vol. 3, pp. 48-56 (Jan. 1998).

Gjerstad et al., "Price Formation in Double Auctions," *Games and Economic Behavior*, vol. 22, article No. GA970576, pp. 1-29 (1998). (Document marked as Received Nov. 30, 1995).

Green Car Congress, "PG&E and Tesla to Research Smart Recharging Vehicle-to-Grid Technology," downloaded from http://www.greencarcongress.com/2007/09/pge-and-tesla-t.html, 3 pp. (Sep. 12, 2007).

Hô et al., "Econophysical Dynamics of Market-Based Electric Power Distribution Systems," *IEEE*, pp. 1-6 (Jan. 2006).

Lu et al., "Reputation-Aware Transaction Mechanisms in Grid Resource Market," *IEEE Sixth Int'l Conf. on Grid and Cooperative Computing*, 6 pp. (Aug. 2007).

Nanduri et al., "A Methodology for Evaluating Auction Based Pricing Strategies in Deregulated Energy Markets," Working Paper, 12 pp. (2005).

Nanduri, et al., "A Reinforcement Learning Model to Assess Market Power Under Auction-Based Energy Pricing," *IEEE Trans. on Power Systems*, vol. 22, No. 1, pp. 85-95 (Feb. 2007).

Plott et al., "Instability of Equilibria in Experimental Markets: Upward-sloping Demands, Externalities, and Fad-like Incentives," Southern Economic Journal, vol. 65 (3), 23 pp. (Jan. 1999).

Satayapiwat et al., "A Utility-based Double Auction Mechanism for Efficient Grid Resource Allocation," *Int'l Symp. on Parallel and Distributed Processing with Applications* (ISPA '08), pp. 252-260 (Dec. 10-12, 2008).

Yin et al., "A Novel Double Auction Mechanism for Electronic Commerce: Theory and Implementation," *IEEE Proc. of the Third Int'l Conf. on Machine Learning and Cybernetics*, pp. 53-58 (Aug. 2004).

Examiner's Report from the Canadian Intellectual Property Office for Canadian Application No. 2,749,373, dated Jan. 6, 2016, 5 pages.

\* cited by examiner

FORWARD-LOOKING TRANSACTIVE PRICING SCHEMES FOR USE IN A MARKET-BASED RESOURCE ALLOCATION SYSTEM

CROSS REFERENCE TO RELATED APPLICATIONS

This application is a divisional of U.S. patent application Ser. No. 13/096,682, filed Apr. 28, 2011, which is hereby incorporated by reference.

FIELD

This application relates generally to the field of power grid management and control.

BACKGROUND

Demand response and dynamic pricing programs are expected to play increasing roles in the modern smart grid environment. These programs typically utilize a price signal as a means to control demand. Active markets allow customers to respond to fluctuations in wholesale electrical costs, but may not allow the utility to directly and completely control demand. Transactive markets, utilizing distributed transactive controllers and a centralized auction, can provide an interactive system that helps ensure that consumer demand is met, supply limits are not exceeded, and that price volatility is reduced. With the current proliferation of computing and communication resources, the ability now exists to create transactive demand response programs at the residential level.

SUMMARY

Disclosed below are representative embodiments of methods, apparatus, and systems for distributing a resource (such as electricity). For example, improved systems and methods for computing supply and demand bids in a transactive and active market are described herein. In particular embodiments, price information from an electricity futures market (e.g., the day-ahead market) is used in determining the bid.

One of the disclosed embodiments is a method for generating a bid value for purchasing electricity in a market-based resource allocation system. In this embodiment, a desired performance value indicative of a user's desired performance level for an electrical device is received. Price information from an electricity futures market is received. A bid value for purchasing electricity from a local resource allocation market sufficient to operate the electrical device at the desired performance level is computed. In this embodiment, the computing is performed based at least in part on the desired performance value and based at least in part on the price information from the electricity futures market. The bid value is transmitted to a computer that operates the local resource allocation market. In some implementations, the electricity futures market is a day-ahead electricity market. In certain implementations, one or more user tolerance values indicative of the user's willingness to tolerate variations from the desired performance level are received, and the bid value is additionally based at least in part on the one or more user tolerance values. In some implementations, the electrical device is one of an air-conditioning unit, heating unit, hot water heater, or refrigerator; and the one or more user tolerance values indicate a lower temperature limit, an upper temperature limit, or both a lower temperature limit and an upper temperature limit. In certain implementations, the price information from the electricity futures market comprises cleared prices from the electricity futures market, and the computing of the bid value is performed using an average of the cleared prices from the electricity futures market and a standard deviation of the cleared prices from the electricity futures market. Such implementations can further comprise computing the average and the standard deviation with the computing hardware or receiving the average and the standard deviation from a remote source. In some implementations, the bid value is additionally based at least in part on price information from the local resource allocation market. For example, the computing of the bid value can be performed using one or more weighted sums computed from the price information from the electricity futures market and from the price information for the local resource allocation market. Further, one or more of the weighted sums can be controlled by a variable weighting factor that varies in response to one or more of the time of day or current demand in the local resource allocation market. Further, the price information from the electricity futures market can comprises price information for a fixed window of time from a day-ahead market, and the price information from the local resource allocation market can comprise price information for a rolling window of time. In certain implementations, the electricity futures market operates using a longer time interval than the local resource allocation market. In some implementations, an indication of a current state of the electrical device and a requested quantity for electricity are transmitted along with the bid value. In certain implementations, an indication of a dispatched value for a current or next upcoming time frame for the local resource allocation market is received from the computer that operates the local resource allocation market, the bid value is compared to the dispatched value, and a signal to activate the electrical device is generated based on the comparison. In some implementations, an expected dispatch value is computed from the dispatched value, one or more earlier dispatched values, and the price information from the electricity futures market; and the desired performance value is adjusted based at least in part on the expected dispatch value. In certain implementations, the electrical device is one of an air-conditioning unit, heating unit, hot water heater, refrigerator, dish washer, washing machine, dryer, oven, microwave oven, pump, home lighting system, electric vehicle charger, or home electrical system.

Another embodiment disclosed herein is a method for generating a bid value for purchasing electricity in a market-based resource allocation system. In this embodiment, an indication of a current status of a system controlled by an electrical device is received. A dispatched index values is received from a day-ahead market for electricity. A bid value for purchasing electricity is computed, the bid value being based at least in part on the indication of the current status of the system and based at least in part on the dispatched index values from the day-ahead market for electricity. The bid value is then transmitted to a computer that operates a local resource allocation market for the electricity. In certain implementations, a user comfort setting selected by a user is received. The user comfort setting can be selected from at least a first user comfort setting and a second user comfort setting, the first user comfort setting indicating the user's willingness to pay more to achieve a desired status of the system controlled by the electrical device relative to the second user comfort setting, and the bid value can be additionally based at least in part on the user comfort setting. In some implementations, the electrical device is a pump and the current status is a measurement of a water level affected by the pump. In other implementations, the electrical device is an electric charger for charging a battery, and the current status of the system is the state of charge of the battery.

Another embodiment disclosed herein is a method for generating a bid value for purchasing electricity in a market-based resource allocation system. In this embodiment, a user comfort setting selected by a user is received, the user comfort setting being selected from at least a first user comfort setting and a second user comfort setting, the first user comfort setting indicating the user's willingness to pay more to achieve a desired performance level for an electrical device relative to the second user comfort setting. A cleared price for electricity is received from a local resource allocation market from which the electrical device receives electricity. Price information is received from an electricity futures market. A probability value of operating the electrical device is computed based at least in part on the user comfort setting, the cleared price for electricity from the local resource allocation market, and the price information from the electricity futures market. A random number is generated. A determination is made as to whether to operate the electrical device by comparing the random number to the probability value. A signal for causing the electrical device to operate is generated based on the comparison. In some implementations, the electricity futures market is a day-ahead electricity market. In certain implementations, the price information from the electricity futures market comprises cleared prices from the electricity futures market, and the computing of the probability value is performed using an average of the cleared prices from the electricity futures market and a standard deviation of the cleared prices from the electricity futures market. The average and the standard deviation can be computed with local computing hardware or received from a remote source. In some implementations, the computing of the probability value is performed based at least in part on the price information from the electricity futures market and at least in part on price information from the local resource allocation market. For example, the computing of the probability value can be performed based at least in part on one or more weighted sums computed from the price information from the electricity futures market and from the price information for the local resource allocation market. Further, one or more of the weighted sums can be controlled by a variable weighting factor. In certain implementations, the price information from the electricity futures market comprises price information from a fixed window of time from a day-ahead electricity market, and the price information from the local resource allocation market comprises price information for a rolling window of time. In some implementations, the electrical device is one of an air-conditioning unit, heating unit, hot water heater, refrigerator, dish washer, washing machine, dryer, oven, microwave oven, pump, home lighting system, electric vehicle charger, or home electrical system.

Another disclosed embodiment is a method for generating an offer value for offering to supply electricity in a market-based resource allocation system. In this embodiment, an offer value indicative of a value at which electricity can be supplied by a generator for a current or next upcoming time frame is computed, the offer value being based at least in part on dispatched index value information from an electricity futures market. The offer value along with a value indicative of a quantity of electricity that can be supplied by the generator during the current or the next upcoming time frame are submitted to the resource allocation system controlled by the resource allocation market. A dispatched index value for the current or upcoming time frame is received from the resource allocation market. In some implementations, the dispatched index value is compared to the offer value, and the generator is activated in response to the comparison. In certain implementations, the electricity futures market is a day-ahead electricity market. In some implementations, the dispatched index value information comprises cleared prices associated with the electricity futures market, and the computing of the offer value is performed using an average of the cleared prices from the electricity futures market and a standard deviation of the cleared prices from the electricity futures market. The average and the standard deviation can be computed locally or received from a remote source. In certain implementations, the computing of the offer value is performed based at least in part on historical dispatched index values for electricity from the electricity futures market and at least in part on historical dispatched index values from the local resource allocation market. For instance, the computing of the offer value can be performed based at least in part on one or more weighted sums computed from the historical dispatched index values from the electricity futures market and the historical dispatched index values from the local resource allocation market. Further, in certain implementations, one or more of the weighted sums are controlled by a variable weighting factor.

Another disclosed embodiment is a method of operating a resource allocation system. In this embodiment, a plurality of requests for electricity are received from a plurality of end-use electrical devices, each of the requests indicating a requested quantity of electricity, a device-requested index value indicative of a maximum price a respective end-use electrical device will pay for the requested quantity of electricity, and an indication of whether the respective end-use electrical device is currently active. A responsive load currently experienced in the resource allocation system is computed by summing the requested quantities of electricity from one or more of the electrical devices that also are currently active. An unresponsive load in the resource allocation system is then computed by computing a difference between the responsive load and a total load currently experienced by the resource allocation system. In certain implementations, a dispatched index value at which electricity is to be supplied is determined based at least in part on the device-requested index values and the unresponsive load. In particular implementations, the dispatched index value is determined using an auction process, and the unresponsive load is submitted to the auction process as a request for electricity having a requested quantity of electricity and a requested index value, the requested quantity of electricity corresponding to the unresponsive load. The requested index value for the unresponsive load can be higher than all other requests for electricity (e.g., at a market price cap). In some implementations, a plurality of offers for supplying electricity is received from a plurality of resource suppliers, each of the offers indicating an offered quantity of electricity and a supplier-requested index value indicative of a minimum price for which a respective supplier will produce the offered quantity of electricity. In such implementations, the dispatched index value can be determined based at least in part on the device-requested index values, the supplier-requested index values, and the unresponsive load. In certain implementations, the acts of receiving the plurality of requests for electricity, computing the responsive load, and computing the unresponsive load are repeated at periodic intervals. In some implementations, the dispatched index value is transmitted to at least one of the end-use electrical devices.

Embodiments of the disclosed methods can be performed using computing hardware, such as a computer processor or an integrated circuit. For example, embodiments of the disclosed methods can be performed by software stored on one or more non-transitory computer-readable media (e.g., one or more optical media discs, volatile memory components (such as DRAM or SRAM), or nonvolatile memory or storage components (such as hard drives)). Such software can be executed on a single computer or on a networked computer (e.g., via the Internet, a wide-area network, a local-area network, a client-server network, or other such network). Embodiments of the disclosed methods can also be performed by specialized computing hardware (e.g., one or more application specific integrated circuits ("ASICs") or programmable logic devices (such as field programmable gate arrays ("FPGAs")) configured to perform any of the disclosed methods). Additionally, any intermediate or final result created or modified using any of the disclosed methods can be stored on a non-transitory storage medium (e.g., one or more optical media discs, volatile memory or storage components (such as DRAM or SRAM), or nonvolatile memory or storage components (such as hard drives)) and are considered to be within the scope of this disclosure. Furthermore, any of the software embodiments (comprising, for example, computer-executable instructions which when executed by a computer cause the computer to perform any of the disclosed methods), intermediate results, or final results created or modified by the disclosed methods can be transmitted, received, or accessed through a suitable communication means.

The foregoing and other objects, features, and advantages of the invention will become more apparent from the following detailed description, which proceeds with reference to the accompanying figures.

DETAILED DESCRIPTION

I. General Considerations

Figure 1:
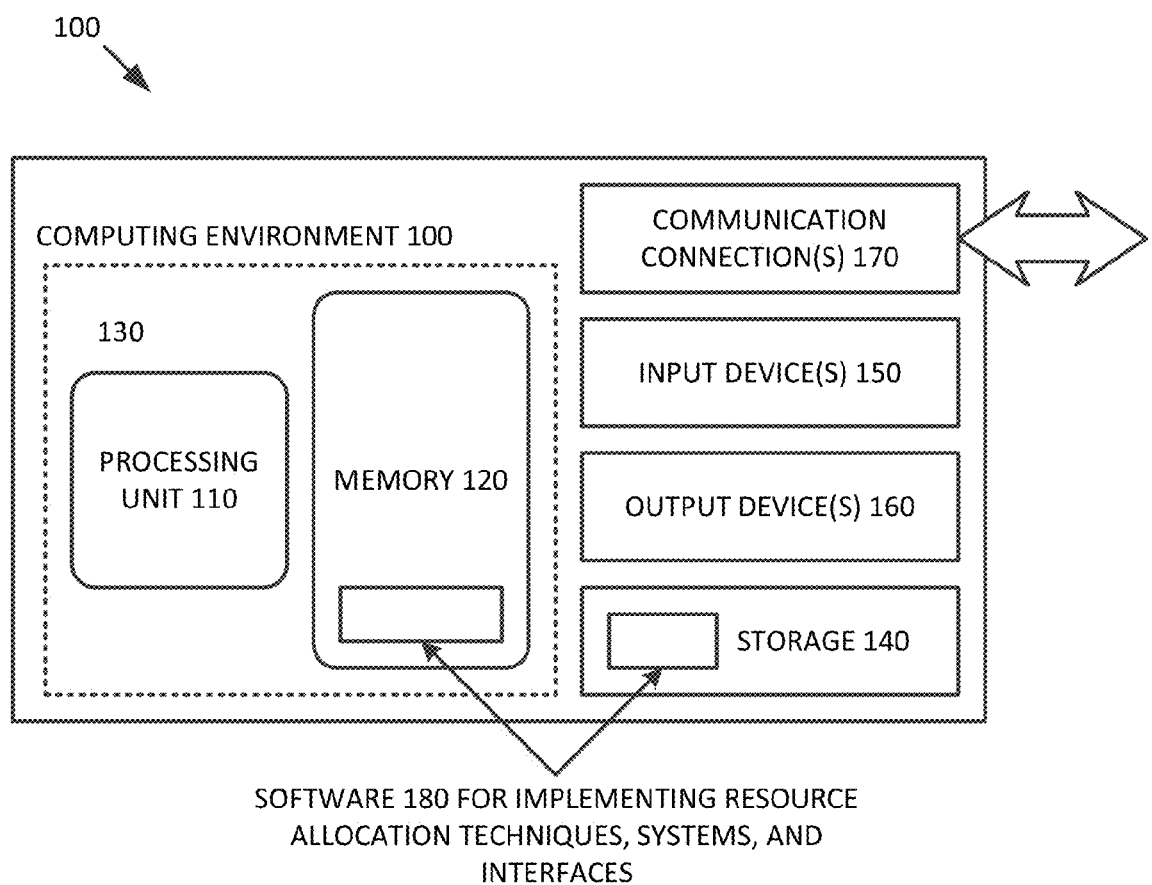
FIG. 1 is a schematic block diagram of a computing environment that can be used to implement embodiments of the disclosed technology.

Disclosed below are representative embodiments of methods, apparatus, and systems for distributing a resource (such as electricity) using a market-based resource allocation system. The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used in various combinations and subcombinations with one another. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "generate" to describe the disclosed methods. These terms are high-level abstractions of the actual operations that are performed. The actual operations that correspond to these terms may vary depending on the particular implementation and are readily discernible by one of ordinary skill in the art. Furthermore, as used herein, the term "and/or" means any one item or combination of items in the phrase.

Any of the disclosed methods can be implemented using computer-executable instructions stored on one or more computer-readable media (e.g., non-transitory computer-readable media, such as one or more optical media discs, volatile memory components (such as DRAM or SRAM), or nonvolatile memory components (such as hard drives)) and executed on a computer (e.g., any commercially available computer). Any of the computer-executable instructions for implementing the disclosed techniques (e.g., the disclosed bid generation, offer generation, or dispatch index generation techniques) as well as any intermediate or final data created and used during implementation of the disclosed resource allocation systems can be stored on one or more computer-readable media (e.g., non-transitory computer-readable media). The computer-executable instructions can be part of, for example, a dedicated software application or a software application that is accessed or downloaded via a network (e.g., through a web browser). More specifically, such software can be executed on a single computer (e.g., any suitable commercially available computer) or in a network environment (e.g., via the Internet, a wide-area network, a local-area network, a client-server network, or other such network).

For clarity, only certain selected aspects of the software-based embodiments are described. Other details that are well known in the art are omitted. For example, it should be understood that the software-based embodiments are not limited to any specific computer language or program. For instance, embodiments of the disclosed technology can be implemented by software written in C++, Java, Perl, JavaScript, Adobe Flash, or any other suitable programming language. Likewise, embodiments of the disclosed technology are not limited to any particular computer or type of hardware. Details of suitable computers and hardware are well known and need not be set forth in detail in this disclosure.

Furthermore, any of the software-based embodiments (comprising, for example, computer-executable instructions which when executed by a computer cause the computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented by an integrated circuit (e.g., an application specific integrated circuit ("ASIC") or programmable logic device ("PLD"), such as a field programmable gate array ("FPGA")). The integrated circuit or specialized computing hardware can be embedded in or directly coupled to an electrical device (or element) that is configured to interact with the resource allocation system. For example, the integrated circuit can be embedded in or otherwise coupled to a generator (e.g., a wind-based generator, solar-based generator, coal-based generator, or nuclear generator); an air-conditioning unit; heating unit; heating, ventilation, and air conditioning ("HVAC") system; hot water heater; refrigerator; dish washer; washing machine; dryer; oven; microwave oven; pump; home lighting system; electrical charger; electric vehicle charger; home electrical system; or any other electrical system having variable performance states.

FIG. 1 illustrates a generalized example of a suitable computing hardware environment 100 in which several of the described embodiments can be implemented. The computing environment 100 is not intended to suggest any limitation as to the scope of use or functionality of the disclosed technology, as the techniques and tools described herein can be implemented in diverse general-purpose or special-purpose environments that have computing hardware.

With reference to FIG. 1, the computing environment 100 includes at least one processing unit 110 and memory 120. In FIG. 1, this most basic configuration 130 is included within a dashed line. The processing unit 110 executes computer-executable instructions. In a multi-processing system, multiple processing units execute computer-executable instructions to increase processing power. The memory 120 may be volatile memory (e.g., registers, cache, RAM), non-volatile memory (e.g., ROM, EEPROM, flash memory), or some combination of the two. The memory 120 stores software 180 for implementing one or more of the described techniques for operating or using the disclosed resource allocation systems. For example, the memory 120 can store software 180 for implementing any of the disclosed dispatch index determination, bidding, or offer strategies described herein and their accompanying user interfaces.

The computing environment can have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 can be removable or non-removable, and includes magnetic disks, magnetic tapes or cassettes, CD-ROMs, DVDs, or any other tangible non-transitory storage medium which can be used to store information and which can be accessed within the computing environment 100. The storage 140 can also store instructions for the software 180 implementing any of the described techniques, systems, or environments.

The input device(s) 150 can be a touch input device such as a keyboard, mouse, touch screen, pen, or trackball, a voice input device, a scanning device, or another device that provides input to the computing environment 100. The output device(s) 160 can be a display, printer, speaker, CD-writer, or another device that provides output from the computing environment 100.

The communication connection(s) 170 enable communication over a communication medium to another computing entity. The communication medium conveys information such as computer-executable instructions, resource allocation messages or data, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The various methods, systems, and interfaces disclosed herein can be described in the general context of computer-executable instructions stored on one or more computer-readable media. Computer-readable media are any available media that can be accessed within or by a computing environment. By way of example, and not limitation, with the computing environment 100, computer-readable media include tangible non-transitory computer-readable media, such as memory 120 and storage 140.

The various methods, systems, and interfaces disclosed herein can also be described in the general context of computer-executable instructions, such as those included in program modules, being executed in a computing environment on a target processor. Generally, program modules include routines, programs, libraries, objects, classes, components, data structures, and the like that perform particular tasks or implement particular abstract data types. The functionality of the program modules may be combined or split between program modules as desired in various embodiments. Computer-executable instructions for program modules may be executed within a local or distributed computing environment.

II. Exemplary Network Topology for Implementing a Resource Allocation Market

Figure 2:
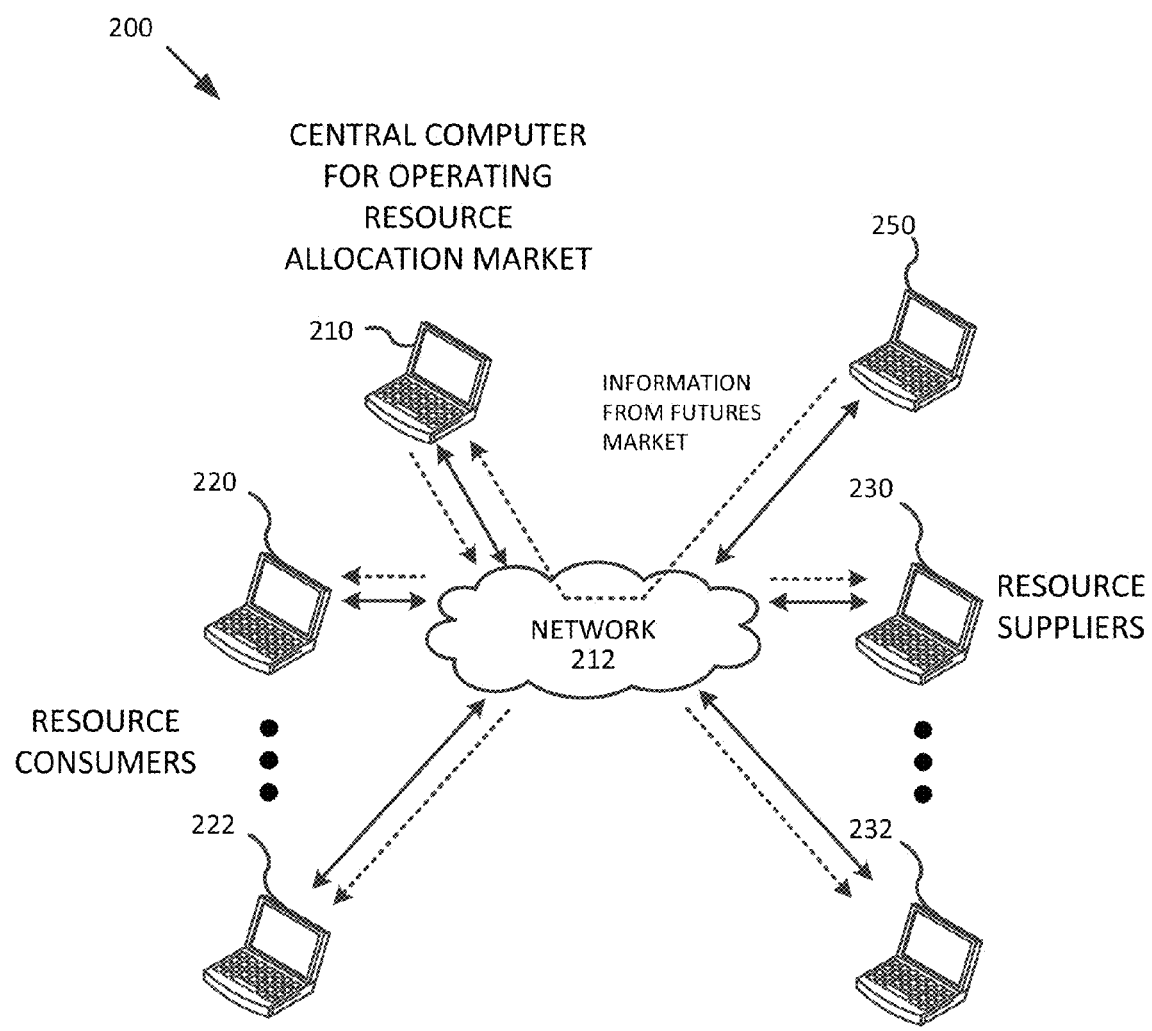
FIG. 2 is a schematic block diagram of a network topology that can be used to implement embodiments of the disclosed technology.

An example of a network topology for implementing a resource allocation market 200 according to the disclosed technology is depicted in FIG. 2. Networked computing devices 220, 222, 230, 232, 250 can be, for example, computing devices having computing hardware that runs software for accessing one or more central computers 210 or that are otherwise configured to communicate with the one or more central computers 210. The one or more central computers 210 in the illustrated embodiment manage and operate the resource allocation market 200. For example, the one or more central computers 210 can be associated with an operator who manages an electrical transmission network that serves or is served by electrical loads or resources associated with the computing devices 220, 222, 230, 232, 250. For instance, the one or more central computers 210 can be associated with a distribution substation, a sub-transmission substation, a transmission substation, or other such transmission node in a power transmission network.

The computing devices 220, 222, 230, 232, 250 and the central computer 210 can have computer architectures as shown in FIG. 1 and discussed above. The computing devices 220, 222, 230, 232, 250 are not limited to traditional personal computers or servers but can comprise other computing hardware configured to connect to and communicate with a network 212 (e.g., specialized computing hardware associated with an electrical device or a power generator (e.g., hardware comprising an integrated circuit (such as an ASIC or programmable logic device) configured to perform any of the disclosed methods)).

In the illustrated embodiment, the computing devices 220, 222, 230, 232, 250 are configured to connect to one or more central computers 210 (e.g., via network 212). In certain implementations, the central computer receives resource bids or requests from those computing devices associated with resource consumers (e.g., devices 220, 222) and receives resource offers from those computing devices associated with resource suppliers (e.g., devices 230, 232, 250). The one or more central computers 210 then compute a value at which the resource is to be dispatched (e.g., using a double auction technique) and transmit this dispatched value to the computing devices 220, 222, 230, 232, 250. When this dispatched value refers to the actual price of the resource, it is sometimes referred to as the "real-time price" and indicates the clearing price of the current time interval or of the next upcoming time interval (e.g., the imminent time interval). In some implementations, this price is also known as the real-time locational marginal price. The time intervals can vary, but in certain implementations is less than one hour (such as 30 minutes or less, 15 minutes or less, 10 minutes or less, 5 minutes or less, or any other interval).

The one or more central computers 210 can also transmit additional data to one or more of the computing devices 220, 222, 230, 232, 250. The additional data can be used by the computing devices 220, 222, 230, 232, 250 to compute a demand bid or supply bid. For example, the additional data can include price information from a forward-looking or futures market (e.g., price information from a day-ahead market). For example, the price can be price information for the same interval as the current interval or the next upcoming interval but in the following day (e.g., a price from the day-ahead market, such as a day-ahead locational marginal price). The price information from the futures market may not be available in the same duration of time interval as the real-time price (e.g., the day-ahead price may apply to a longer interval (such as 1 hour) when compared to the interval of the real-time price information) but can overlap with the current interval or the next upcoming interval. For purposes of this disclosure, the price information from a forward-looking or futures market is generally referred to herein as a "future price."

The price information from a futures market is typically available from power transmission entities or other power industry entities that maintain or participate in a forward-looking market, and most commonly refers to price information from the day-ahead market but can be price information from a market for other future time periods (e.g., for a future time period other than the next upcoming time interval in the relevant resource allocation system for which a dispatch value is being computed). Briefly, the day-ahead market refers to a financial market where market participants purchase and sell energy at financially binding day-ahead prices for the following day. As a result of the day-ahead market, a financially binding schedule of commitments for the purchase and sale of energy is developed each day based on the bid and offer data submitted by the market participants. The day-ahead market allows buyers and sellers to lock in their price and hedge against volatility in the real-time energy market. Examples of such day-ahead markets include the day-ahead market operated by PJM Interconnection LLC.

In the embodiment illustrated in FIG. 2, the price information from a futures market (e.g., the day-ahead market information) is accessed and received by the one or more central computers 210 from a provider 250 (e.g., a regional transmission provider or transmission provider at the next highest hierarchical level in the transmission network). Furthermore, as shown in the illustrated embodiment, the provider 250 is itself a resource supplier that bids an offer to the market resource allocation market 200. For example, the provider 250 can be a regional transmission provider that offers electricity at a wholesale price to the resource allocation market 200 operated by the one or more central computers 210.

In still further embodiments, the additional information may include information computed from the real-time price information and/or from the price information from the futures market. For example, in particular implementations, the additional information is used to compute other derivative values at the one or more central computers 210 that are then transmitted to the computing devices 220, 222, 230, 232, 250. For example, and as more fully explained below, an average price and/or a standard deviation can be computed from the real-time price or from the price information from the futures market. The average price can be computed from prices of adjacent intervals (e.g., prices in the preceding m intervals) or from prices at the same interval from earlier days (e.g., prices from the same interval (such as the one hour interval beginning at 9:00 p.m.) from the preceding n days). The average price and/or standard deviation can then be transmitted to the computing devices 220, 222, 230, 232, 250. In still other embodiments, a single price deviation value can be computed by dividing the average of the real-time prices or the future prices over some interval and dividing by the standard deviation (e.g., the value can be the average/standard deviation) or by dividing the difference between the cleared real-time or futures price and the average of the real-time or future prices over some interval by the standard deviation (e.g., $P_{dev} = (P_{clear} - P_{average})/\sigma_{actual}$). This price deviation, referred to herein as v, is the number of standard deviations the real-time or futures price is from the average price and, in some embodiments, can be the only signal used to control the system. In still further embodiments, one or more of the computing devices 220, 222, 230, 232, 250 themselves compute the other derivative values from the real-time price information, the future price information, or both the real-time price information and the future price information.

Although the information shown as being exchanged in FIG. 2 is identified as price information, the information may be generalized to information that is indicative of a price or relates to an index that is capable of being monetized. For example, the real-time price can be a real-time dispatched index value, and the price information from a futures market can be dispatched index values from a futures market.

In the illustrated embodiment, the one or more central computers 210 are accessed over a network 212, which can be implemented as a Local Area Network ("LAN") using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Furthermore, at least part of the network 212 can be the Internet or a similar public network. The one or more central computers 210 can be located at a transmission node for the resource allocation market itself (e.g., at a distribution substation, sub-transmission substation, transmission substation, or other transmission node locale) or can alternatively be located remotely (e.g., at a centralized location that is responsible for managing and operating multiple resource allocation markets).

The various possible roles and functionalities of the computing devices 220, 222, 230, 232, 250 and the one or more central computers 210 will be described in more detail in the following sections.

III. Embodiments of the Disclosed Resource Allocation Scheme

A. General Case of a Nested, Hierarchical Resource Allocation Schema

Figure 3:
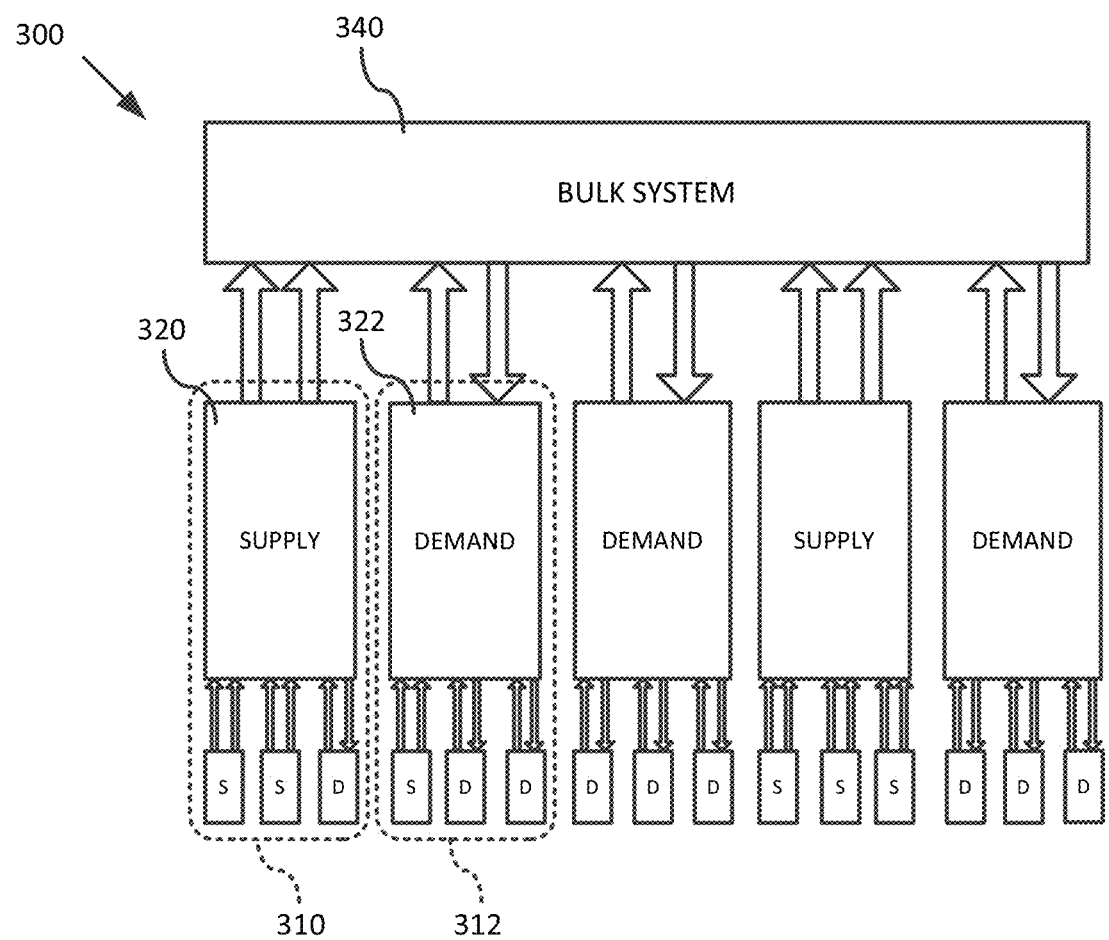
FIG. 3 is a block diagram of an exemplary resource allocation system that can be nested to any arbitrary depth with consumers making demand requests and producers making supply offers.

FIG. 3 is a schematic block diagram illustrating an embodiment of a resource allocation system 300 according to the disclosed technology. In the embodiment shown in FIG. 3, system 300 comprises multiple nested resource allocation systems (two of which are shown as subsystems 310 and 312 and which can operate using the network topology illustrated in FIG. 2), which themselves comprise self-similar resource allocation subsystems. The resource allocation system 300 can be nested to any arbitrary depth with net producers (such as net producer 320) making supply offers and net consumers (such as net consumer 322) making demand requests to a larger bulk system 340. In certain embodiments, the system 300 does not include nested subsystems, but comprises a single-level system in which a central system (e.g., a distribution service provider) communicates with consumers and suppliers that have no nested subsystems. Any of the nested subsystems can operate using a network topology such as that shown in FIG. 2 for operating a local resource allocation market.

All resources that are limited in some manner and can be measured can be allocated independently in such a system. The embodiments disclosed herein generally concern applying the resource allocation system 300 to an electrical power grid in which electrical power is limited, but it is to be understood that this application is not limiting. The resource allocation system can be used in other contexts as well, including water supply, Internet wireless bandwidth distribution, or other such markets having limited resources.

In the illustrated embodiment, each of the resource allocation markets operates by periodically collecting demand requests from consumers and supply offers from resource suppliers and determining an index value (e.g., a "price" or "cleared price") at which the resource allocation is to be dispatched. As more fully explained below, the dispatched index value is determined from the demand requests and supply offers. In one particular embodiment, the process is different than traditional markets in that an index that is capable of being monetized (rather than just a currency value itself) is used. The index provides a common valuation method for participants in the system. For ease of presentation, reference will sometimes be made in this disclosure to the index for a resource as though it were the actual price of the resource. It is to be understood that such reference includes not only the situation where the index is the currency, but also the situation where the index is another index unit that is capable of being monetized or traded.

B. Participants and Accounts

In one embodiment of the disclosed technology, at least some of the participants in the system have accounts in which the fund of index units at their disposal is kept. As consumers use resources, their index fund balances are debited, and as producers deliver resources, their index fund balances are credited. Index funds can be credited using a variety of mechanisms, including up-front deposits (e.g., through incentives), periodic deposits (e.g., with income), or purchased funds from a separate index fund market when producers sell funds.

C. Supply Offers and Demand Requests

In one exemplary embodiment of the disclosed technology, end-use consumers use computing devices (e.g., transactive controllers or active controllers) to request resources from their local distribution service provider based on their current needs (e.g., the needs of the appliances or electrical devices in the consumer's residence or business). For example, end-use consumers can input their resource requests through a web site that transmits the user's requests over the Internet to one or more central computers that are used by the distribution service provider to allocate the resource. In such instances, the requests can be computed and transmitted by executing computer-executable instructions stored in non-transitory computer-readable media (e.g., memory or storage). Alternatively, a consumer's end-use appliances or electrical devices can be configured to themselves compute the resource requests (in which case the appliance or device can be considered as the end-use consumer or resource consumer). In such instances, the requests can be computed using computing equipment (e.g., a transactive controller or active controller) embedded in the appliances or electrical devices themselves. In still another embodiment, computing equipment at the consumer's residence or locale can collect information from one or more of the consumer's appliances or electrical devices and transmit aggregated requires to the local distribution service provider.

The computing equipment can comprise a computer system (e.g., a processor and non-transitory computer-readable media storing computer-executable instructions) or can comprise a specialized integrated circuit (e.g., an ASIC or programmable logic device) configured to compute the resource request or offer. If the requests are computed by the appliances or electrical devices themselves, the requests can be directly sent to the one or more central computers of the distribution service provider (e.g., via the Internet) or can be aggregated with other requests (e.g., using a computer or other computing equipment at the consumer's home). For instance, the appliances and electrical devices at the consumer's home can transmit their requests (e.g., wirelessly using Wi-Fi or the like) to a local computer, or a computer-based home energy management system ("HEMS"), which aggregates the requests. The aggregated requests can then be sent together to the distribution service provider (e.g., as a single request to the central computer or as a single message comprises a string of requests).

In one exemplary embodiment, resource requests comprise at least two pieces of information: the quantity of the resources desired (described, for example, as a rate of consumption for the time frame over which the resource will be allocated) and the requested index value. In some embodiments, the requested index value is the maximum index value at which the quantity will be consumed. Desirably, resource consumers submit at least one such request for each time frame in which they wish to consume, and the time frame is determined by the local distribution service provider. The time frame can vary from embodiment to embodiment, but in some embodiments is 60 minutes or less, 15 minutes or less, or 5 minutes or less, and some embodiments can use mixed time and/or overlapping frames. As more fully explained below, the time frame can depend on the size of the resource allocation system and the number of nested resource allocation markets within the overall system. In general, the time frame used in a lower-level system in a nested framework will be less than the time frame for a higher-level system in the nested framework. After receiving such requests within the time frame, the local distribution service provider can compute and dispatch the index value at which each resource is allocated. This value is sometimes referred to herein as the "dispatched index value" or "dispatched value." In applications where the value is the actual price, this value is sometimes referred to herein as the "settled price," "clearing price," or "real-time price"

In one exemplary embodiment, resource suppliers use computing devices (e.g., transactive controllers) to submit offers for resources to the local distribution service provider based on the current cost of providing the resources. Resource suppliers can include, for example, utility substations at the same or higher transmission level (e.g., transmission substations, subtransmission substations, or distribution substations), merchant generators (e.g., large-scale power generators using coal-, nuclear-, wind-, solar-, hyro-, or geothermal-based power generation), local generators (e.g., diesel generators or smaller scale solar or wind generators) or consumer-based generators (e.g., electric vehicles). For example, the supply offers can be computed and submitted over the Internet using a computer system (e.g., using a dedicated web site). Alternatively, the supply offer can be computed and transmitted using a specialized integrated circuit configured to compute the resource offer (e.g., an ASIC or programmable logic device). Any such computing hardware can be coupled directly to and provide control over the relevant equipment for supplying the resource. For instance, the computing hardware can be integrated with the control equipment for an electrical power generator, thereby allowing the computing hardware to directly activate and deactivate the generator as needed.

In one exemplary embodiment, offers comprise at least two pieces of information: the quantity of the resources available (described, for example, as a rate of production for the time frame over which the resource will allocated) and the requested index value for the quantity of the resource. In some embodiments, the requested index value is the minimum index value at which the resource will be produced. Producers desirably submit at least one such offer for each time frame in which they wish to produce resources, and the time frame is determined by the service provider.

In one exemplary embodiment for operating the resource allocation system, consumers are required to consume the resources which they requested only if they requested the resource at an index value greater than or equal to the dispatched index value. Conversely, consumers are prohibited from consuming the resources if they requested the resource at an index value less than the dispatched index value for that time frame. These rules can be enforced, for example, at the appliance or electrical device level (e.g., using appropriate shut-off hardware) or enforced by control signals sent from a computer at the consumer's home or locale to the relevant appliance or electrical equipment. Violation of these rules can be subject to a penalty (e.g., a penalty levied against the offender's index fund account). Furthermore, in some embodiments of the disclosed technology, consumers can submit unconditional requests that require the distribution service provider to deliver the resource at any price, and require the consumer to accept it at any price.

Similarly, in one exemplary embodiment for operating the resource allocation system, producers are required to produce the resources which they offered only if they offered the resource at an index value less than or equal to the dispatched index value. Conversely, producers are prohibited from producing resource if they offered the resource at an index value greater than the dispatched index value for that time frame. Violation of the rules can be subject to a penalty levied against their index fund accounts. Furthermore, in some embodiments of the disclosed technology, producers can submit unconditional offers that require the distribution service provider to accept the resource at any price, and require the producer to supply it at any price.

D. Aggregation Services

Figure 4:
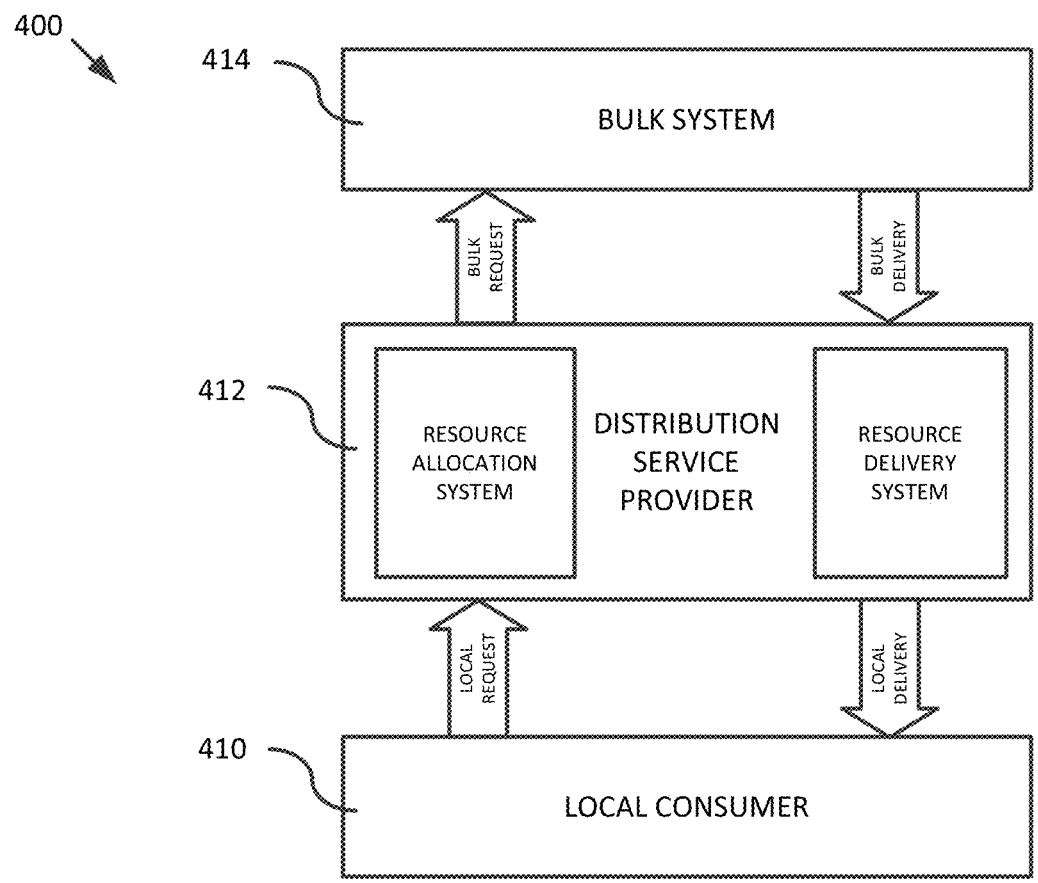
FIG. 4 is a block diagram showing a resource consumer who makes demand requests to a local resource allocation system and who consumes the resource based on the dispatched allocation index. The local resource allocation system in FIG. 4 aggregates the consumer's demand request with other requests.

In certain embodiments of the disclosed technology, and as noted above, a service provider may in turn be a consumer or producer with respect to another service provider, depending on whether they are a net importer or exporter of resources. Examples of such arrangements are shown in block diagrams 400 and 500 of FIGS. 4 and 5, respectively. In particular, FIG. 4 is a diagram 400 showing a local resource consumer 410 that makes demands on a local distribution service provider 412 (e.g., a local feeder), who in turn aggregates local requests to make an aggregated bulk request to a service provider at the next-higher level in the hierarchy. In the illustrated embodiment, the service provider at the next-higher level is a bulk distribution service provider 414 (e.g., a regional distribution service provider), but can be another higher-order service provider in the system (e.g., a subtransmission substation, transmission substation, or other such provider).

Figure 5:
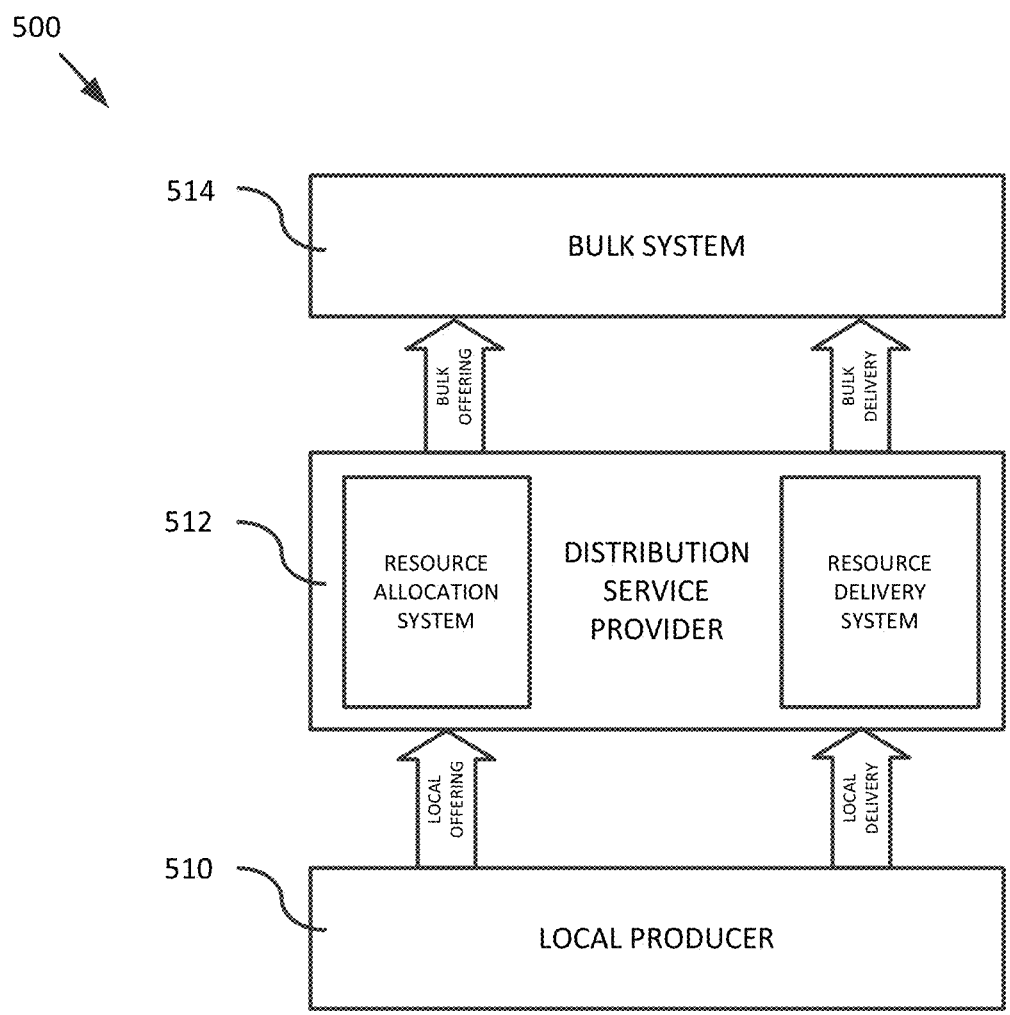
FIG. 5 is a block diagram showing a resource producer who makes supply offers to a local resource allocation system and who supplies the resource based on the dispatched allocation index. The local resource allocation system in FIG. 5 aggregates the producer's supply offer with other offers.

FIG. 5 is a diagram 500 showing a local producer 510 that makes offers to a local distribution provider 512 (e.g., a local feeder), who in turn aggregates local offers to make an aggregated offer to a service provider at a next-higher level in the hierarchy. In the illustrated embodiment, the service provider at the next-higher level is a bulk distribution provider 514 (e.g., a regional distribution service provider), but can be another higher-order service provider in the system (e.g., a subtransmission substation, transmission substation, or other such provider).

Any number of service providers can be combined to construct a system of arbitrary size and complexity.

In certain embodiments of the disclosed technology, producers and consumers can make non-firm offers and requests as well, but such requests can have an index premium with respect to the firm offers and requests presented during a given time frame. The premium can be based, for example, on the difference between the aggregate cost of load following in the service providers system and the cost the same in the bulk system (load following service cost arbitrage).

E. Multiple Time Frames

As resources are aggregated to larger and larger system, the time frame over which allocation is performed can be lengthened. For example, the lowest-level localized resources (e.g., feeder-level resources) might be dispatched on a 5 minute time frame, mid-level resources (e.g., regional-level or transmission-level resources) might be dispatched on a 15 minute time frame, and highest-level resources (e.g., bulk-grid-level resources) transmission resources might be dispatched on a 1 hour time frame. This permits aggregators to also aggregate over time by exchanging or moving blocks of resources across time frames using storage capacities and ramp rates.

Both consumers and producers can break their total demand and supply into multiple requests and offers spanning multiple time frames. For example, in the face of 10% uncertainty (or other percentage of uncertainty) in the quantity needed, a consumer can request the mean quantity of the needed resources in a longer time frame at any price and exchange (buy or sell) the remaining 10% fluctuation (or other percentage of fluctuation) in a shorter time frame at any price.

Additionally, in certain embodiments, bids can be submitted to the higher-level markets for resources that are to be supplied during one or more future time frames that are not imminent (e.g., time frames that occur during the following day, following two days, following week, or any such future time frame). Such bids for future time windows can be in addition to the bid for the next time interval and can be used to help secure power and settle the bulk-resource market in advance of the actual power needs. In some implementations, such bids for future time windows indicate a future energy need (kWh) rather than an imminent current power need (kW).

F. An Exemplary Resource Allocation Strategy

In each time frame, and at one or more of the hierarchical levels of the resource allocation system, the dispatched index value and quantity allocated is determined by a resource allocation service. The resource allocation service can be implemented by one or more computing devices at each level of the system and according to a network topology such as that shown in FIG. 2. Furthermore, the resource allocation service can be implemented using computer-executable instructions stored on one or more computer-readable media (e.g., non-transitory computer-readable media, such as storage or memory) which when executed by a computer will cause the computer to perform a resource allocation method, such as any of the techniques described below.

A wide variety of methods can be used to determine the dispatched index value. In certain embodiments, however, the dispatched index value is determined using a double auction technique. For instance, in one particular embodiment, the following technique is used. The requests and offers are separated into two groups. Each group is sorted by the index value provided, requests being sorted by descending value, and offers by ascending value (or vice versa). Next, each item in the sorted lists is given a quantity level computed by adding its quantity to the previous item's quantity level, with the first items quantity level being its quantity alone. Finally, the dispatched index value is found by determining the index value at which the same quantity level for requests and offers occurs. In one embodiment, this can occur in one of two ways. Either two requests bind a single offer, in which case the supplier is required to supply less than the offered quantity and the offer index value is the dispatched index value; or two offers bind a single request, in which case the consumer is required to consume less than the requested quantity with only partial resources and the request index value is the dispatched index value. Additionally, there are some special cases that although rare are desirably handled explicitly. Whenever both consumers and suppliers mutually bind each other at a given quantity level, the dispatched index value can be the mean of the offer and request indexes, the request index, or the offer index. In certain embodiments, the method that maximizes the total benefit (e.g., profit) to both consumers and producers is chosen and in cases where more than one index level maximizes the total benefit, the index level which most equitably divides the total benefit between consumers and producers is chosen. Exemplary market clearing scenarios are discussed in greater detail below in Section III.M.

Figure 6:
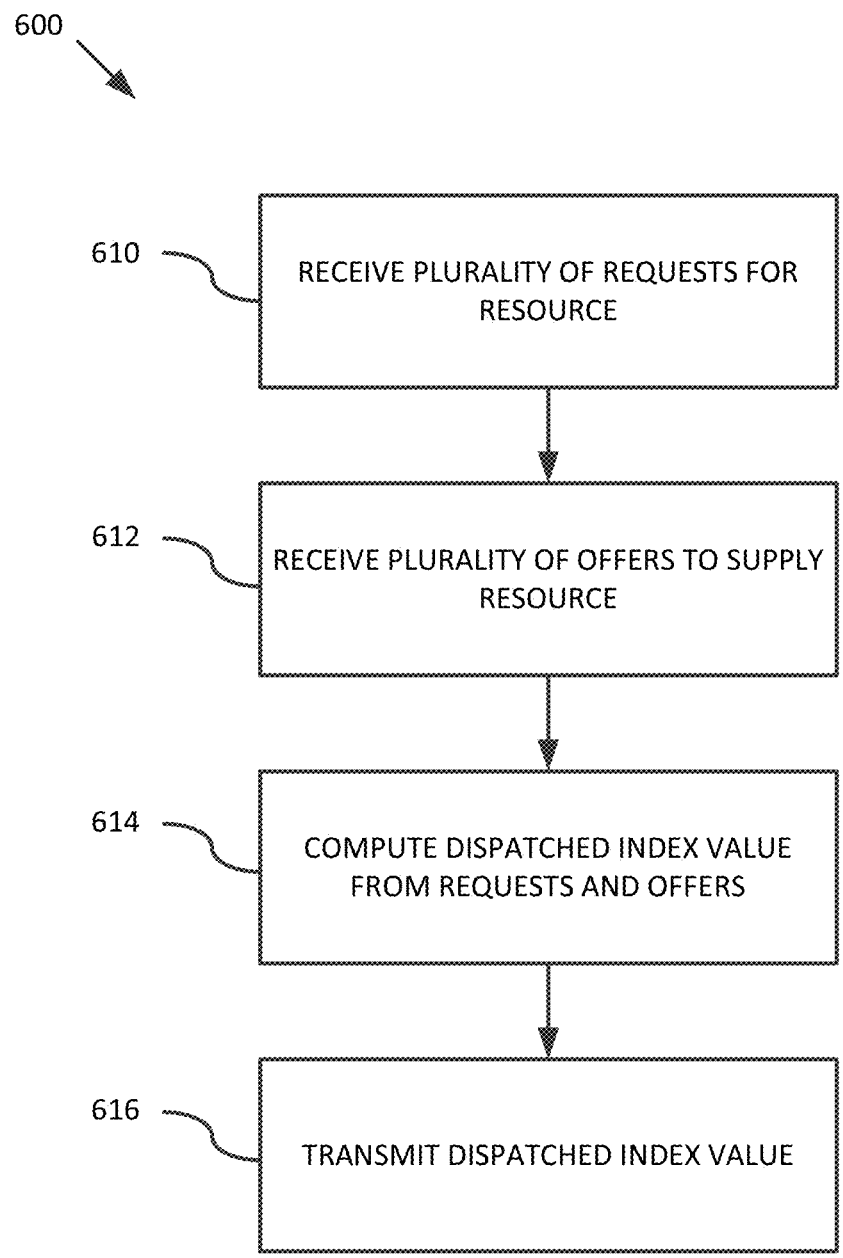
FIG. 6 is a flowchart showing a generalized method for clearing offers and requests as can be used in any of the disclosed resource allocation systems.

FIG. 6 is a flowchart 600 showing a generalized method for clearing offers and requests as can be used in any of the disclosed resource allocation systems. The particular method shown in FIG. 6 is for a system for allocating electricity resources, but this usage should not be construed as limiting. The method can be performed using computing hardware (e.g., a computer processor or a specialized integrated circuit). For instance, the method can be performed by computing hardware such as shown in FIG. 1 that manages the resource allocation market for a particular subsystem or in the resource allocation scheme.

At 610, a plurality of requests for electricity are received from a plurality of resource consumers (e.g., electrical devices, home consumers, or other electrical service providers in the hierarchy). The requests can comprise data messages indicating a requested quantity of electricity and a consumer-requested index value (e.g., a maximum price a respective electrical-power user will pay for the requested quantity of electricity.

At 612, a plurality of offers for supplying electricity are received from a plurality of resource suppliers (e.g., local generators, merchant generators, or other electrical service providers in the hierarchy, such as service providers at the next-highest hierarchical level). The offers can comprise data messages indicating an offered quantity of electricity and a supplier-requested index value (e.g., a minimum price for which a respective supplier will produce the offered quantity of electricity).

At 614, a dispatched index value is computed at which electricity is to be supplied based at least in part on the consumer-requested index values and the supplier-requested index values. In some implementations, the act of determining the dispatched index value is performed using a double auction method. For example, the act of determining the dispatched index value can comprise separating the requests and the offers into two groups, sorting each item in the two groups according to a quantity level, and determining the dispatched index value by determining the index value at which the same quantity level for requests and offers occurs.

At 616, the dispatched index value is transmitted to at least one of the consumers or resource suppliers (e.g., using suitable communication means, such as the Internet or other network). In certain embodiments, additional information is transmitted with the dispatch index value. As noted above with respect to FIG. 2, the additional information can include price information from a futures market (e.g, day-ahead price information). Furthermore, in certain embodiments, other values can also be transmitted, such as values derived from the dispatched index value (e.g., an average and standard deviation of the dispatched index value over a selected time frame) or values derived from the price information from the futures market (e.g., an average and standard deviation of the day-ahead price).

Methods acts 610, 612, 614, and 616 can be repeated at periodic intervals (e.g., intervals of 60 minutes or less, 10 minutes or less, 5 minutes or less, or other such interval). Furthermore, it should be understood that the method acts 610 and 612 do not necessarily occur in the illustrated sequence. Instead, the orders and requests can be received substantially simultaneously. For instance, the orders and requests can be received at various times and/or orders within a given time period and before the dispatched index is determined.

G. Demand Strategies

In some cases, suppliers or consumers desirably place offers or bids that nearly guarantee that they obtain consumers or suppliers, respectively. To help generate an offer or request that has a high likelihood of being accepted by the local resource allocation system, a supplier or consumer can use a recent history of dispatched index values from the local market and/or a recent history of the dispatched index values from a futures market (e.g., a day-ahead market) to forecast the most likely dispatched index value for a particular offer or request time frame and to adjust the offer or request based on this information. This ability to adjust a request or offer allows a consumer or supplier to utilize an adaptive bidding or offer strategy. As more fully illustrated below, such adaptive strategies are useful in a variety of settings.

One possible adaptive request strategy is to compute the average and the standard deviation of the dispatched index values from the local market and/or the local dispatched index values from the futures market (e.g., the prices from the day-ahead market) over the last N time frames, where N is a relatively large number compared to the time frame (e.g., 20, 50, 100 or more). When consumers cycle their demand for resources periodically, they can adjust the consumption time to exploit times when the index is low. In one particular embodiment, the control decision for consumption can be offset by the computed average (or a weighted function of two or more computed averages (such as averages of the dispatched index values from the local market and dispatched index values from the futures market)) and scaled by the computed standard deviation (or a weighted function of two or more computed standard deviations (such as standard deviations of the dispatched index values from the local market and dispatched index values from the futures market)) before being submitted to the resource allocation system.

In some embodiments, the last N time frames that are used are consecutive time frames. For instance, if N is selected to account for the previous 24 hours, if the duration of a time frame is 5 minutes, and if the current time frame is 3:00 p.m., then the dispatched index value from the 3:00 p.m. time frame the previous day, the index from the 3:05 p.m. time frame the previous day, the index from the 3:10 p.m. time frame the previous day, and so on, can be used. In other embodiments, the last N time frames that are used are from the same time frame (or similar time frame) as the current time frame but are from different days (e.g., consecutive prior days). For instance, if N is selected to account for the previous 7 days, if the duration of a time frame is 5 minutes, and if the current time frame is 3:00 p.m., then the dispatched index value from the 3:00 p.m. time frame from the previous 7 days can be used. Various combinations of these time frames can also be used (e.g., the index values for multiple time frames around the current time frame from multiple previous days). This flexibility can help further account for variations in demand that arise throughout a day.

Many consumers that employ adaptive control also use a similar strategy to determine the operating point from the dispatched index value. This can be done by adjusting the control set-point based on the dispatched index value.

The following paragraphs introduce general embodiments for generating bid values in a resource allocation system, such as any of the resource allocation systems disclosed herein. Specific implementations of these generalized embodiments are introduced in Section IV below.

Figure 7:
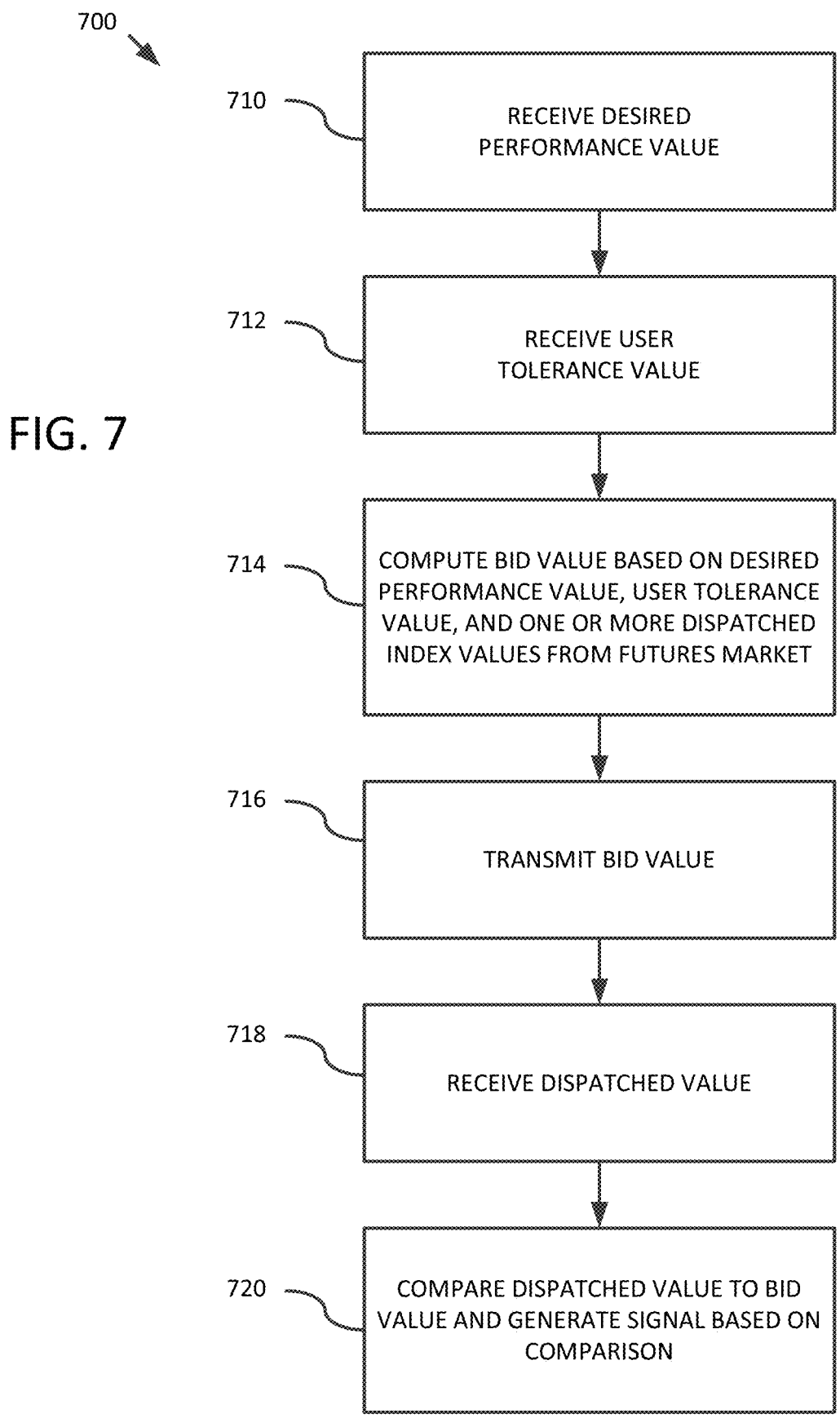
FIG. 7 is a flowchart showing a general embodiment for computing bids in any of the disclosed recourse allocation system using two-way communications.

FIG. 7 is a flowchart 700 showing a generalized embodiment for computing bids in any of the disclosed recourse allocation system using two-way communications (e.g., a transactive controller). The particular method shown in FIG. 7 is for an electrical device in a system for allocating electrical resources, but this usage should not be construed as limiting. The electrical device can be a variety of devices, such as an air-conditioning unit; heating unit; heating, ventilation, and air conditioning (HVAC) system; hot water heater; refrigerator; dish washer; washing machine; dryer; oven; microwave oven; pump; home lighting system; electrical charger; electric vehicle charger; home electrical system; or any other electrical system having variable performance states. The method of FIG. 7 can be performed using computing hardware (e.g., a computer processor or an integrated circuit). For instance, the method can be performed by a computer at an end-user's locale or home, a computer coupled to an electrical device, or by specialized hardware (e.g., an ASIC or programmable logic device) coupled to the electrical device. Furthermore, it should be understood that the method acts in FIG. 7 do not necessarily occur in the illustrated sequence.

At 710, a desired performance value indicative of a user's desired performance level for an electrical device is received (e.g., loaded, buffered into memory, or otherwise input and prepared for further processing). For example, a desired temperature for a temperature-controlled environment can be received.

At 712, one or more user tolerance values indicative of the user's willingness to tolerate variations from the desired performance level are also received (e.g., loaded, buffered into memory, or otherwise input and prepared for further processing). For example, a comfort setting reflective of comfort versus economy (such as any of the comfort settings shown in Table 1 below or similar comfort setting) can be received. In certain embodiments, the user tolerance value is selected from at least a first tolerance value and a second tolerance value, the first tolerance value resulting in higher bid values relative to the second tolerance value. The comfort setting can comprise a single value that is representative of the user's tolerance, or can comprise multiple values that represent upper and/or lower limits of the performance of the electrical device (e.g., a low temperature and a high temperature). The performance value and user tolerance value can be input by the user, for example, through an appropriate graphical user interface displayed on a computer or through a keypad, touch screen, dial, or other control mechanism associated with the electrical device.

At 714, a bid value for purchasing electricity sufficient to operate the electrical device at the desired performance level is computed. In the illustrated embodiment, the bid value is based at least in part on the desired performance value and the user tolerance value. In the illustrated embodiment, the bid value is additionally based at least in part on one or more values indicative of the dispatched index values from a futures market (e.g., prices from a day-ahead market). The dispatched index values from the futures market can be, for example, the day-ahead prices for the current day (e.g., a blocked 24-hour window). Further, the bid value can be additionally based at least in part on one or more values indicative of dispatched index values for the local market (the market to which the bid value will be submitted). The dispatched index values from the local market can be, for example, the dispatched index values from a previous time period (e.g., the previous 3 hours) and can be updated on a rolling window basis. In certain embodiments, the bid value is based on a combination of the dispatched index values from the futures market and the dispatched index values from the local market (e.g., a weighted combination). Any of these values can be computed locally at the electrical device, or can be transmitted from the one or more central computers.

Additionally, and as more fully explained below, the bid value can be based on an average and/or a standard deviation of the dispatched index values from the futures market. Likewise, the bid value can be based on an average and/or a standard deviation of the dispatched index values from the local market, or some combination of the averages and/or standard deviations. In alternative embodiments, a single dispatched index value from a futures market and/or a single dispatched value (e.g., the most recently dispatched value) is used. In still other embodiments, a value other than the average or standard deviation is derived from the multiple available values and used to perform the method (e.g., a median value, weighted sum, or other such derived value). Any of these values can be computed locally at the electrical device, or can be transmitted from the one or more central computers. In further embodiments, a current performance level of the electrical device can also be received. In such embodiments, the bid value can also be based at least in part on the current performance level.

At 716, the bid value is transmitted to one or more central computers (e.g., one or more computers that manage and operate a local resource allocation market by, for instance, conducting the auction process for the market) in the market-based resource allocation system (e.g., using suitable communication means, such as the Internet or other network). In certain embodiments, the quantity of the resources desired (described, for example, as a rate of consumption for the time frame over which the resource will be allocated) is also transmitted to the one or more central computers. Additionally, in some embodiments, the current state of the electrical device associated with the bid is also transmitted to the one or more central computers (e.g., as a value that indicates whether the electrical device is current on (or active) or off (or inactive)). As more fully explained below, this state information can be used by the operator of the resource allocation market to determine the nonresponsive load that is serviced by the local resource allocation market.

At 718, an indication of a dispatched index value for a current (or next upcoming) time frame is received from the one or more central computers. In certain embodiments, a value other than the dispatched value is received from the one or more central computers but which is indicative of the dispatched value. For example, the value can indicate a difference between a last dispatched value and a newly dispatched value. As noted, the one or more central computers can transmit other information as well (e.g., one or more of dispatched index value(s) from a futures market, averages of the dispatched index values from the futures market and/or the local market, or standard deviations of the dispatched index values from the futures market and/or the local market).

At 720, the bid value is compared to the dispatched value for the current (or next upcoming) time frame, and a signal is generated to activate or deactivate the electrical device based on this comparison (e.g., if the bid value is equal to or exceeds the dispatched value for the current time frame, a signal to activate is generated; otherwise, a signal to deactivate is generated).

Any combination or subcombination of the disclosed method acts can be repeated after a fixed period of time (e.g., a time period of 15 minutes or less, 5 minutes or less, or other such time period). In certain embodiments, some of the received values are reused for subsequent time frames. For example, the user-selected performance value and user tolerance value can be stored and reused for subsequent time frames. In such instances, method acts 710 and 712 need not be repeated.

Figure 8:
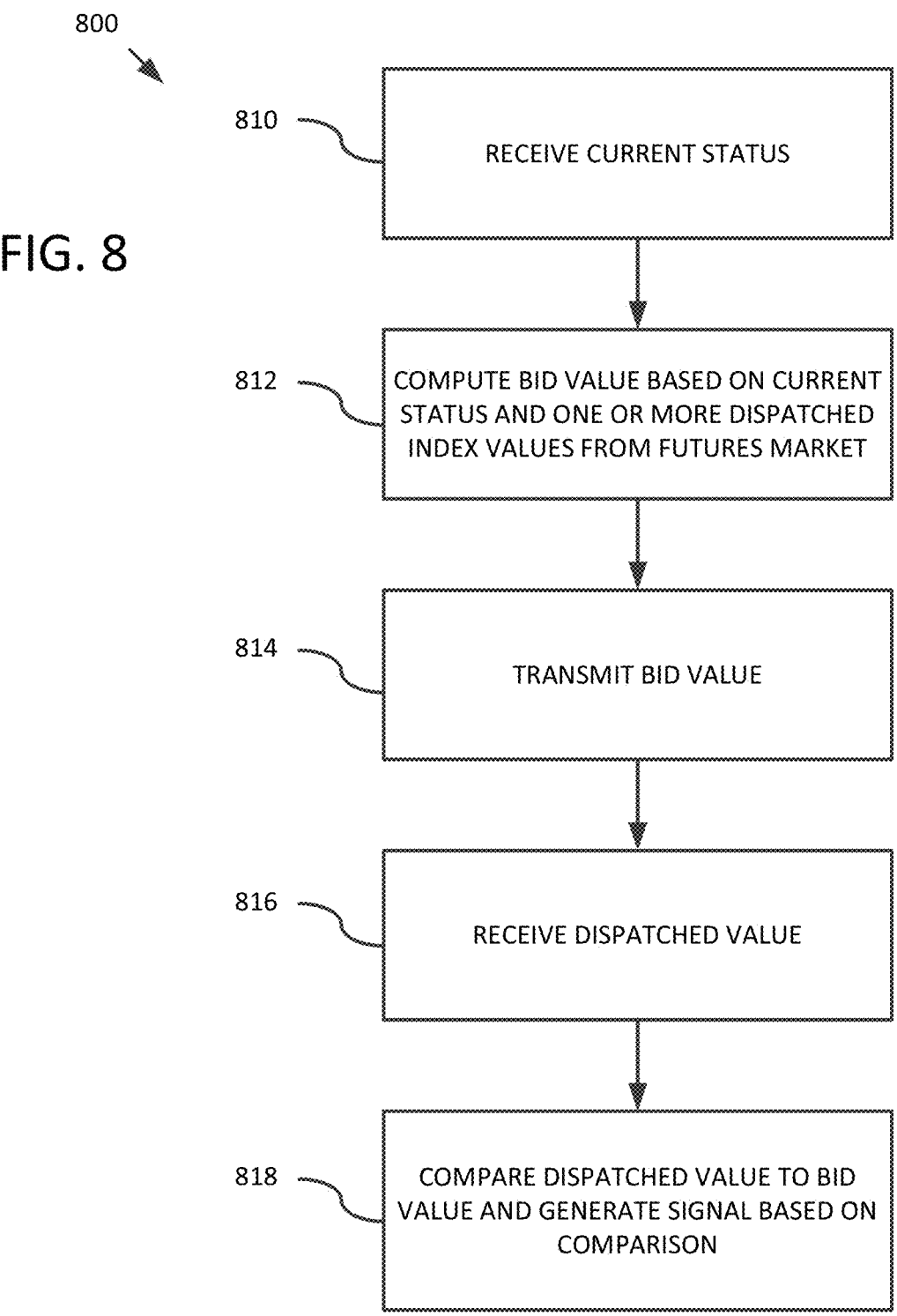
FIG. 8 is a flowchart showing another general embodiment for computing bids in any of the disclosed recourse allocation system using two-way communications.

FIG. 8 is a flowchart 800 showing another generalized embodiment for computing bids in any of the disclosed recourse allocation system using two-way communications (e.g., through transactive controllers). The method in FIG. 8 can be performed by computing devices like those mentioned above with respect to FIG. 7. Likewise, the bids computed by the method in FIG. 8 can be associated with electrical devices like those mentioned above. In one particular embodiment, the electrical device is a pump.

At 810, an indication of a current status of a system controlled by an electrical device is received. For example, if the electrical device is a pump, the current status of the system can be a measurement of a water level affected by the pump.

At 812, a bid value for purchasing electricity sufficient to operate the electrical device is computed. In the illustrated embodiment, the bid value is based at least in part on the current status of the system and on one or more additional values, which in the illustrated embodiment include one or more values indicative of the dispatched index values from a futures market (e.g., prices from a day-ahead market). The additional values can comprise, for example, any one or more of the values discussed above with respect to FIG. 7 (e.g., one or more of dispatched index values from a futures market, dispatched index values from the local market, averages of the dispatched index values from the futures market and/or the local market, or standard deviations of the dispatched index values from the futures market and/or the local market). Any of these values can be computed locally at the electrical device, or can be transmitted from the central computer. In some embodiments, a user comfort setting and/or desired performance level selected by a user (e.g., a user comfort setting and/or desired performance level as explained above with respect to FIG. 7) is also received. In these embodiments, the bid value is additionally based at least in part on the user comfort setting.

At 814, the bid value is transmitted to one or more central computers (e.g., one or more computers that manage and operate a local resource allocation market by, for instance, conducting the auction process for the market) in the market-based resource allocation system (e.g., using suitable communication means, such as the Internet or other network). In certain embodiments, the quantity of the resources desired (described, for example, as a rate of consumption for the time frame over which the resource will be allocated) is also transmitted to the one or more central computers. Additionally, in some embodiments, the current state of the electrical device associated with the bid is also transmitted to the one or more central computers.

At 816, an indication of a dispatched value for a current (or upcoming) time frame is received from the one or more central computers. In certain embodiments, a value other than the dispatched value but which is indicative of the dispatched value is received. For example, the value can indicate a difference between a last dispatched value and a newly dispatched value. As noted, the one or more central computers can transmit other information as well (e.g., one or more of dispatched index value(s) from a futures market, averages of the dispatched index values from the futures market and/or the local market, or standard deviations of the dispatched index values from the futures market and/or the local market).

At 818, the bid value is compared to the dispatched value for the current (or upcoming) time frame, and a signal is generated to activate or deactivate the electrical device based on this comparison (e.g., if the bid value is equal to or exceeds the dispatched value for the current time frame, a signal to activate is generated; otherwise, a signal to deactivate is generated).

Any combination or subcombination of the disclosed method acts can be repeated after a fixed period of time (e.g., a time period of 15 minutes or less, 5 minutes or less, or other such time period). In certain embodiments, some of the received values are reused for subsequent time frames. For example, the user comfort setting can be stored and reused for subsequent time frames.

Figure 9:
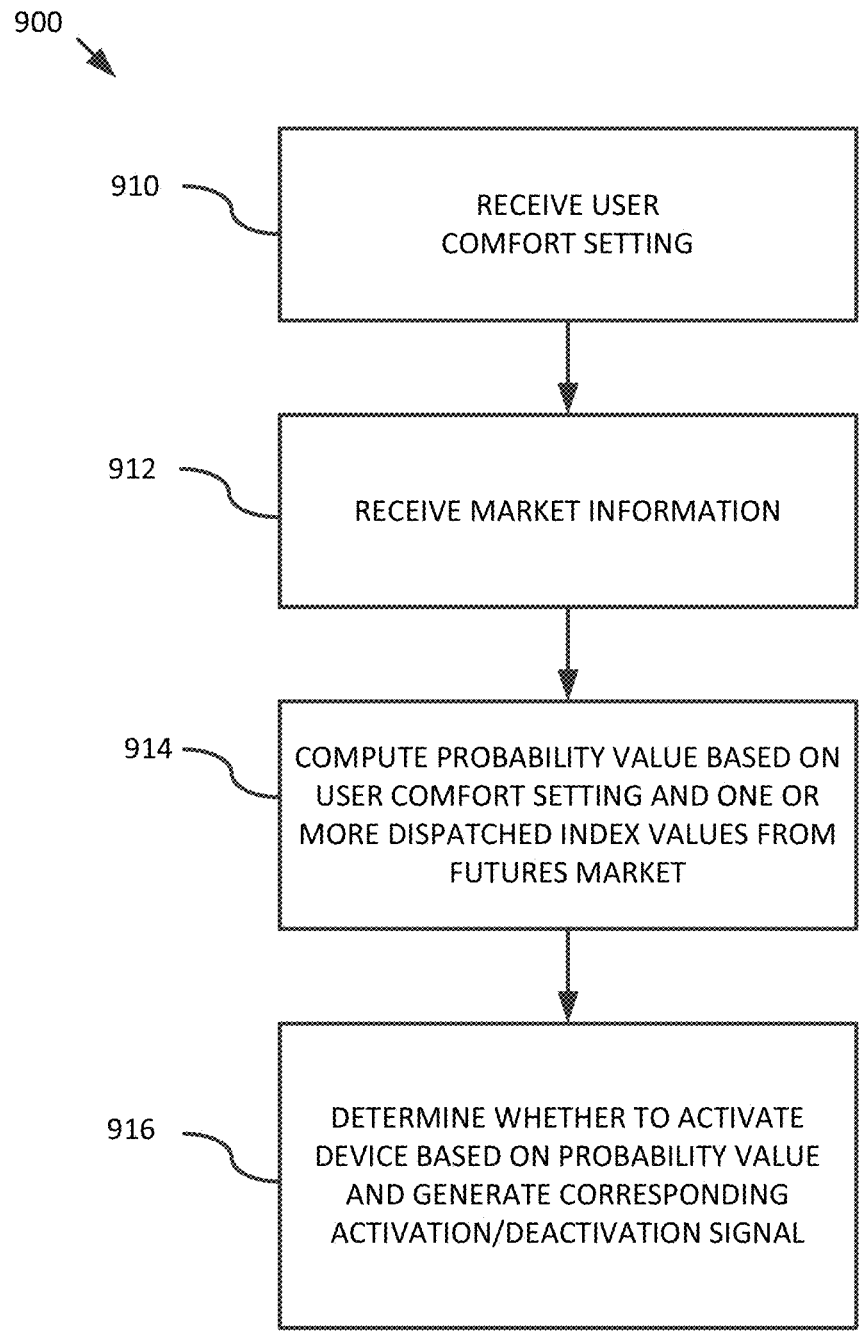
FIG. 9 is a flowchart showing a general embodiment for computing bids in any of the disclosed recourse allocation system using one-way communications.

FIG. 9 is a flowchart 900 showing a general embodiment for computing bids in any of the disclosed recourse allocation system using one-way communications (e.g., using an active controller). The particular method shown in FIG. 9 is for an electrical device in a system for allocating electrical resources, but this usage should not be construed as limiting. The electrical device can be a variety of devices, such as an air-conditioning unit; heating unit; heating, ventilation, and air conditioning ("HVAC") system; hot water heater; refrigerator; dish washer; washing machine; dryer; oven; microwave oven; pump; home lighting system; electrical charger; electric vehicle charger; home electrical system; or any other electrical system having variable performance states. The method of FIG. 9 can be performed using computing hardware (e.g., a computer processor or an integrated circuit). For instance, the method can be performed by a computer at an end-user's locale or home, a computer coupled to an electrical device, or by specialized hardware (e.g., an ASIC or programmable logic device) coupled to the electrical device. Furthermore, it should be understood that the method acts in FIG. 9 do not necessarily occur in the illustrated sequence.

At 910, one or more user tolerance setting selected by a user is received. For example, a user comfort setting as described above with respect to FIG. 7 can be received. The user tolerance value can be input by the user, for example, through an appropriate graphical user interface displayed on a computer or through a keypad, touch screen, dial, or other control mechanism associated with the electrical device.

At 912, market information is received. For example, the market information can be transmitted from the one or more central computers. In the illustrated embodiment, the market information includes a value indicative of the dispatched index value from a futures market (e.g., the price from a day-ahead market). The market information can further include information about the dispatched index value for the local market (e.g., the price in the local market for the most recent time period or the next upcoming time period).

At 914, a probability value of operating the electrical device is computed based on at least the user comfort setting and one or more additional values. The additional values can comprise, for example, any one or more of the values discussed above with respect to FIG. 7 (e.g., one or more of the average and/or standard deviation of historical dispatch values of the local market, historical dispatch values from other levels or markets within the resource allocation system, and/or the dispatch values of a futures market). Any of these values can be computed locally at the electrical device, or can be transmitted from the one or more central computers.

At 916, a determination is made as to whether to operate the electrical device using the probability value, and a signal is generated to cause the electrical device to operate based on this determination. In some implementations, for instance, a random number is generated, which is compared to the probability value. If the random number is less than (or in some embodiment greater than) the probability value, then the signal for causing the electrical device to operate is generated; otherwise, a signal for causing the electrical device to deactivate can be generated.

Any combination or subcombination of the disclosed method acts can be repeated after a fixed period of time (e.g., a time period of 15 minutes or less, 5 minutes or less, or other such time period). In certain embodiments, some of the values are reused for subsequent time frames. For example, the user comfort setting can be stored and reused for subsequent time frames.

H. Supply Strategies

Suppliers can consider many factors when computing their offer index value. For example, if there is a production start-up cost, it can be spread over a minimum of M time frames using the formula:

$$\text{index} = \text{variable} + \frac{\text{startup}}{M \cdot \text{capacity}} \quad (1)$$

where index is the index value of the offer, variable is the time-dependent index value, startup is the index value of starting production, and capacity is the total production capacity of the unit. The variable term can correspond to or be computed from the average of one or more dispatched index values over N previous time frames (e.g., any one or more of the dispatched index values described above with respect to FIG. 7, including the dispatched index values from the futures market and/or the dispatched index values from the local market). In certain embodiments, the variable term is also based at least in part on the standard deviation of those dispatched index values. As noted above with respect to FIG. 7 other derivative values can also be used to compute the variable term. The variable term can have any of the values of the average price $P_{average}$ described below in Section V.

Similarly, a supplier for which production is already engaged can adjust their offer strategy by lowering their offer's index when they wish to assure their resource is used for a minimum number of time frames. In order to compensate for the potential lost returns during those minimum run time periods, suppliers can increase their initial start-up index enough to offset for potential losses. Here again, one approach is for resource producers to use the average and/or standard deviation of previously dispatched index values (e.g., any one or more of the dispatched index values described above with respect to FIG. 7, including the dispatched index values from the futures market and/or the dispatched index values from the local market) to forecast the most likely variations and use an increment (M) that minimizes the potential loss over the desired minimum run time:

$$\text{index} = \text{variable} - M \frac{\text{shutdown}}{\text{runtime}} \quad (2)$$

where index is the offer index value, variable is the time-dependent index value (e.g., as explained above with respect to Equation (1)), shutdown is the index value of shutting down production, and runtime is the number of periods over which the unit has already run.

Another common objective for suppliers is that they not exceed a maximum production quota allotted for a number of time frames. One solution to this problem is to adjust the offer's index price based on how much of the allotment has been used in relation to number of time frames that have past. Producers that have used a disproportionately high allotment remaining will have lower offers than those that have used a disproportionately low allotment remaining. For example, a supplier with a limited operating license can use:

$$\text{index} = \text{variable} + \text{capacity} \cdot \text{fixed} \frac{\text{remaining}}{\text{license} - \text{run}} \quad (3)$$

where index is the offer index value, variable is the time-dependent index value (e.g., as explained above with respect to Equation (1)), fixed is the time-independent index value, remaining is the number of time frames remaining unused in the license, license is the number of time frames in the license, and run is the number of time frames used in the license.

Figure 10:
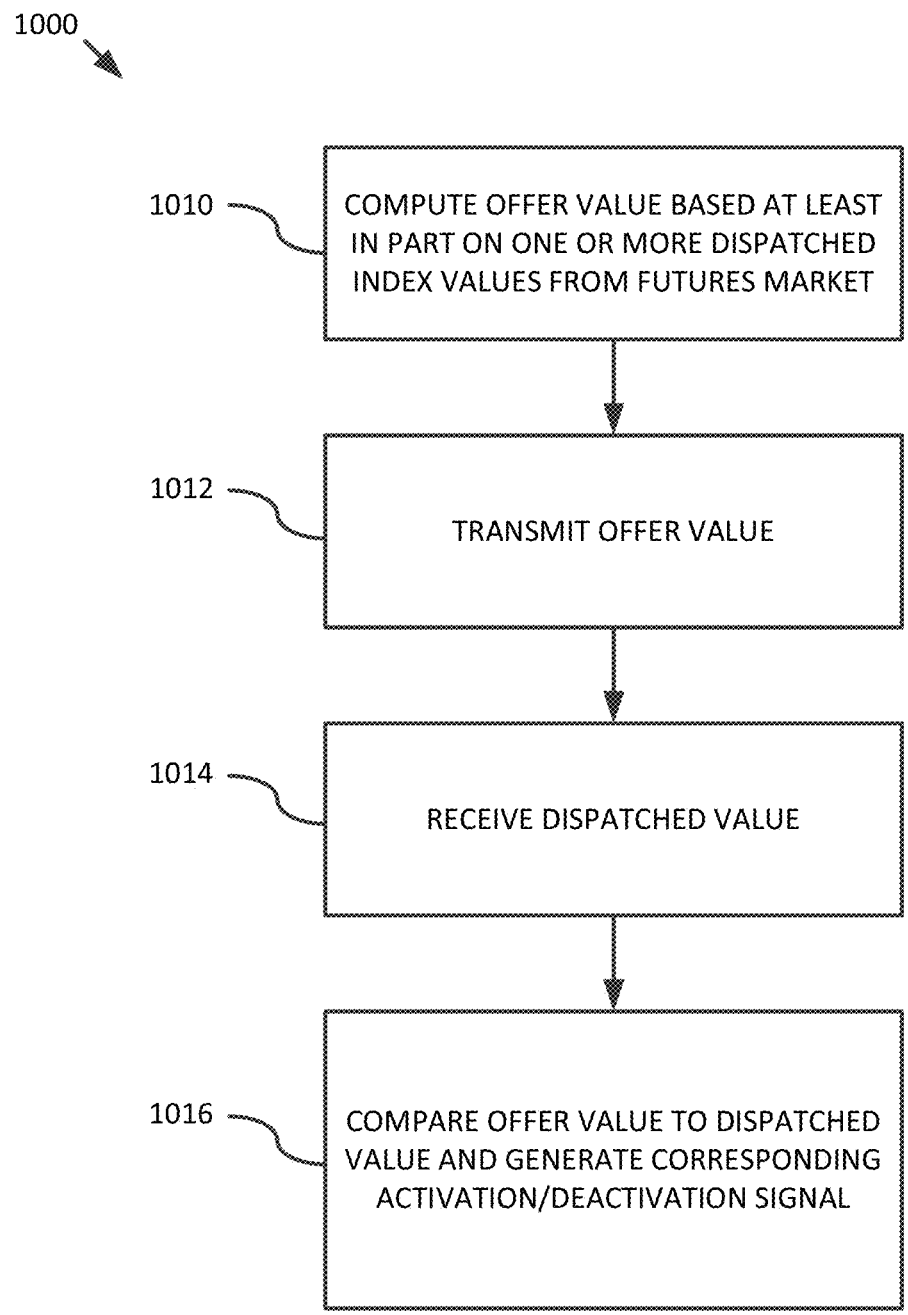
FIG. 10 is a flowchart showing a general embodiment for generating offer values for use in any of the disclosed recourse allocation systems.

FIG. 10 is a flowchart 1000 showing a general embodiment for generating offer values for use in any of the disclosed recourse allocation systems. The particular method shown in FIG. 10 is for an electrical resource (e.g., a generator) in a system for allocating electrical resources, but this usage should not be construed as limiting. The method of FIG. 10 can be performed using computing hardware (e.g., a computer processor or a specialized integrated circuit). For instance, the method can be performed by a computer at a supplier's locale, a computer coupled to an electrical generator, or by specialized hardware (e.g., an ASIC or programmable logic device) coupled to the electrical generator. Furthermore, it should be understood that the method acts in FIG. 10 do not necessarily occur in the illustrated sequence.

At 1010, an offer value indicative of a value at which electricity can be supplied by a generator for a current (or upcoming) time frame is computed. In the illustrated embodiment, and as explained above, the offer value is based at least in part on any one or more of the values discussed above with respect to FIG. 7 (e.g., any one or more of the dispatched index values described above with respect to FIG. 7, including the dispatched index values from the futures market and/or the dispatched index values from the local market). Any of these values can be computed locally at the electrical device, or can be transmitted from the one or more central computers. The offer value can also be additionally based at least in part on a startup cost for supplying the electricity, a shutdown cost for supplying the electricity, and/or a remaining number of time frames available in an operating license associated with the electricity as described above (e.g., using a weighted sum or other technique).

At 1012, the offer value is transmitted to the one or more central computers (e.g., one or more computers that manage and operate a local resource allocation market by, for instance, conducting the auction process for the market) along with a value indicative of a quantity of electricity that can be supplied by the generator during the current time frame (or next upcoming time frame) (e.g., using suitable communication means, such as the Internet or other network).

At 1014, an indication of a dispatched value for a current (or upcoming) time frame is received from the one or more central computers. In certain embodiments, a value other than the dispatched value but which is indicative of the dispatched value is received. For example, the value can indicate a difference between a last dispatched value and a newly dispatched value. As noted, the one or more central computers can transmit other information as well (e.g., one or more of dispatched index value(s) from a futures market, averages of the dispatched index values from the futures market and/or the local market, or standard deviations of the dispatched index values from the futures market and/or the local market).

At 1016, the dispatched value is compared to the offer value, and the generator is activated in response to the comparison.

Any combination or subcombination of the disclosed method acts can be repeated after a fixed period of time (e.g., a time period of 15 minutes or less, 5 minutes or less, or other such time period). In certain embodiments, some of the values are reused for subsequent time frames. Furthermore, there are instances when the offer value is used as a bid in the market-based resource allocation system. For example, when the electrical resource is configured with an emergency transfer switch for supplying particular consumers in the power grid, then the offer value can be used as a bid value along with a value indicative of a magnitude of electrical load the generator can remove from the power grid.

I. Ramp Rates

Some resources cannot change their production or consumption output more than a certain amount within a single time frame. In this case, the resource being offered is not the quantity, but the change in quantity. This situation can be handled by treating the change in quantity as a distinct resource rather than as an extra feature of an existing resource. This way, resources for which ramp rates apply have an extra resource allocation strategy, which can be handled separately and independently. This strategy also helps maintain the independence of each resource as regards its allocation.

J. Multiple Resources

Each consumer and producer can engage in both demand and supply of any number of resources. For example, a producer may offer to supply a quantity of X at index A, while simultaneously requesting a quantity of Y at index B. If the producer depends on having Y in order to produce X, it addresses the risk of losing access to Y while still having to produce X by either adjusting the offer and request indexes, or ensuring that it has an alternate source for Y or is ready to pay the penalty for not delivering X. The same considerations apply for consumers.

K. Effect of Constraints

Frequently situations arise where a resource that is available in one part of a service provider's system cannot be delivered in its entirety to another part of the same system. Such delivery constraints can be addressed by segregating the system into two separate resource allocation systems that operate independently. For example, the system with surplus resources can make a supply offer into the system with a deficit, and the system with a deficit can make a consumption request from the surplus system. Each system can dispatch its own index value, in which case the index difference will represent the impact of the constraint on both systems. In some embodiments, the aggregator resource allocation system can credit a capacity expansion account, which is used to support the improvement of the connection between the two such that the constraint is eventually addressed.

L. Capacity Management Market

The resource allocation system described above can also be operated as a capacity management market. A capacity management market can be viewed as a special case of the transactive market that attempts to manage congestion in its local market (e.g., a market at the distribution feeder level). The congestion limit may be caused by local conditions, such as thermal conductor ratings, or for higher level reasons, such as the reduction of localized congestion on sub-transmission networks, or any combination of the above. In the discussion below, the congestion limit is illustrated as being applied at the feeder level to reduce peak demand, though this usage should not be construed as limiting.

Figure 11:
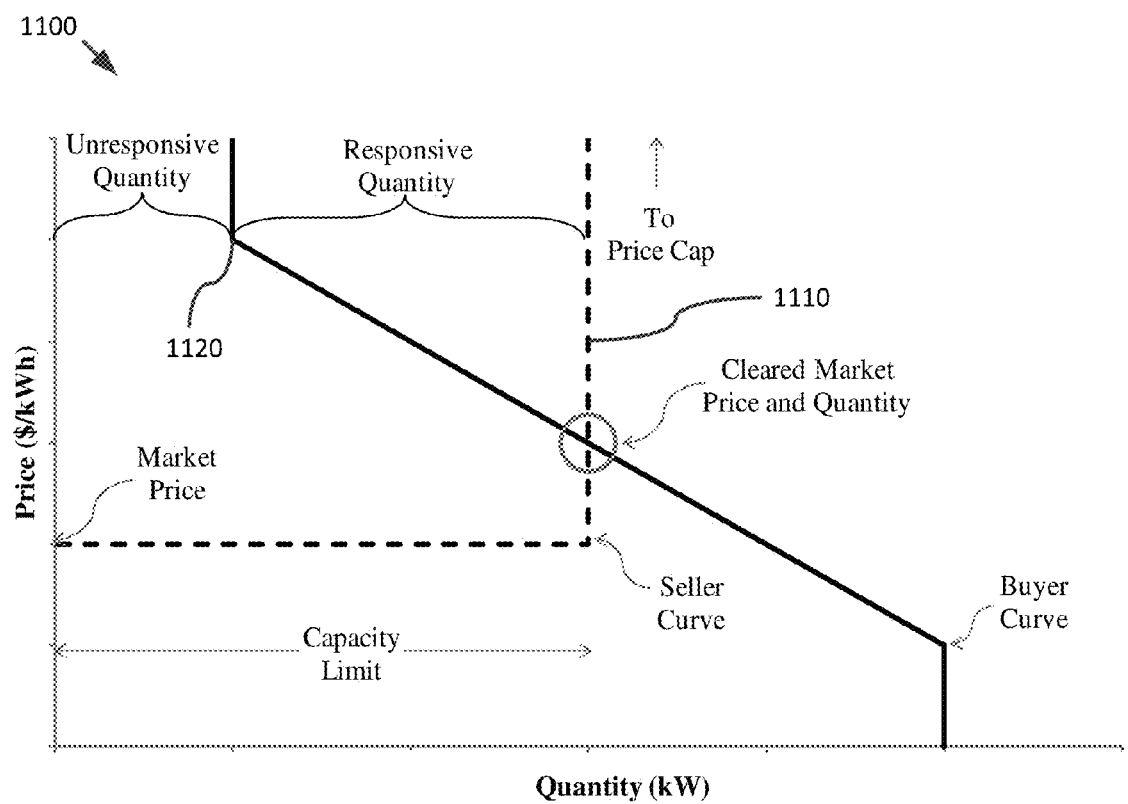
FIG. 11 is a graph illustrating an example of capacity market buyer and supply curves.

The transactive controllers described herein deal with bidding the price and quantity of a load into the auction, termed the "responsive" load. However, the supplier bids and the non-bidding loads on the system (such as lights, refrigerators, or losses) are also desirably accounted for and bid into the auction. The non-bidding loads are called "unresponsive" loads, because their demand does not change as a function of price. In certain embodiments, the operator of the capacity management market fills the role of supply bidder, while also accounting for the unresponsive loads. To bid the supplier curve, the operator of the capacity management market bids the congestion limit at the uncongested market price. FIG. 11 is a graph 1100 illustrating the resulting supply curve that is formed. In particular, FIG. 11 shows that when the congestion is bid and forms the only bid in the market, a vertical line 1110 is formed at the congestion quantity to the price cap of the market. In general, the uncongested market price is the bulk cost of electricity plus mark-up, such as the Locational Marginal Price ("LMP"), or any other appropriate price signal, such as direct purchase of power from distributed generators.

Another typical objective of the operator of the capacity management market is to estimate the total amount of load on the feeder and then determine what portion of the load is responsive versus unresponsive to the price signal. The total load can be measured directly from the equipment requiring the capacity limit, such as a substation transformer. The currently responsive load can be determined from the control bids received from transactive controllers. In particular embodiments, for example, the transactive controllers transmit their current operational state at the market intervals in addition to the other information associated with their demand bids. In one embodiment, the currently responsive load is determined by summing the quantity of the demand currently in an active (or "ON") state as follows:

$$Q_{resp} = \sum_{1}^{N} Q_{bid\text{-}N} * \text{state}, \quad (4)$$

where state equals "0" if the electronic device is OFF, and "1" if the electronic device is ON, and N is the total number of submitted bids. The unresponsive load is then determined by subtracting the responsive load from the total load. The unresponsive load quantity is then bid into the market at the market price cap (or some other value that is greater than the other bids) by the operator of the capacity management market, as shown by line 1120 in FIG. 11.

During periods of time when the total load is less than the capacity limit, the electronic devices will respond by adjusting their setpoints to the current market price. However, when the total load tries to exceed the capacity limit, the capacity management market will increase the price of electricity to limit the quantity at the capacity limit, effectively reducing the total load to within the constrained limits.

M. Exemplary Market Clearing Scenarios

Any one or more of the exemplary market clearing scenarios described below can be utilized or experienced in embodiments of the resource allocation systems described herein. For example, the one or more central computers used to manage and operate a local resource allocation market can determine the dispatched index or market clearing price using any of the techniques described below, depending on the bidding scenario presented.

Market clearing begins with the sorting of both buying and selling components. In certain embodiments, buyers are sorted from highest price to lowest price. Sellers are sorted from lowest price to highest price. In certain embodiments, buyer and seller curves are then created by the cumulative sum of the quantities associated with these sorted prices. In particular implementations, the curves are implemented as computer-usable representations of the curves that are computed and stored once the necessary input data is received. The representations of the curves can comprise, for example, arrays of values or other computer-usable data elements or structures. The two, sorted curves can then be overlaid or otherwise analyzed to determine an intersection between the curves. For example, each curve can be considered to move from one extreme in price to the other (e.g., the buyer curve will traverse from a $+\infty$ price to a $-\infty$ price, and the seller curve will traverse from a $-\infty$ price to a $+\infty$ price. In FIGS. 13-23 discussed below, these extremes occur at the zero-quantity location and after all seller or bidder quantities are bid (right edge of the bidding curve)).

In general, the market clears at the intersection of the buying and selling curves of the market. According to certain embodiments of the disclosed technology, for a discrete bidding scenario, four distinct, valid clearing situations are supported. The resulting clearing price and quantity are slightly different for each scenario and are desirably handled appropriately. Two more invalid, or failure, scenarios are also possible. For each scenario presented in FIGS. 13-23, buyers are represented in the descending curve and sellers are represented in the ascending curve, and the final market clearing point is designated by a circle or point. There are five distinct buyers and four distinct sellers in each of the four, valid market clearing examples. The two other clearing scenarios (failure and null) follow the same convention, but may have different numbers of buyers and sellers.

Figure 13:
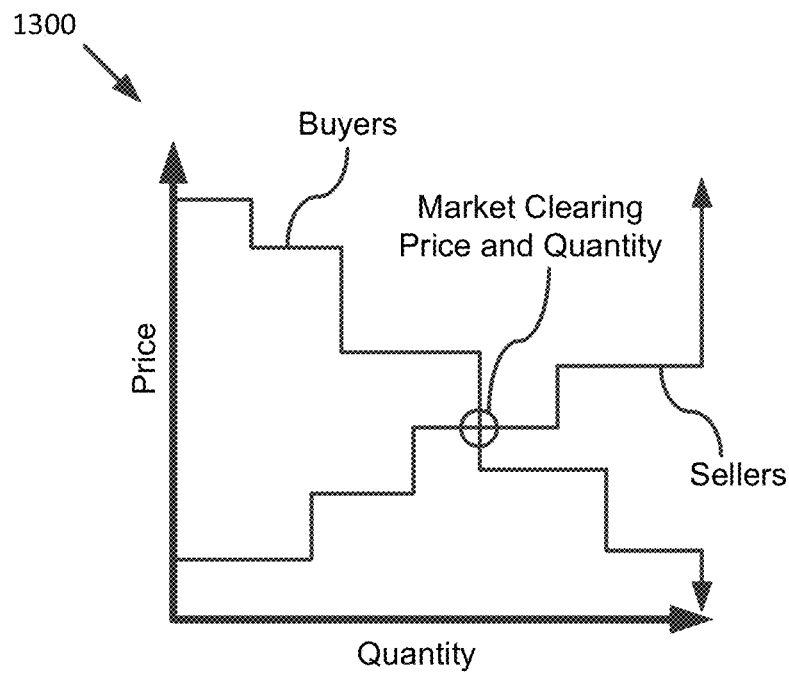
FIGS. 13-24 are diagrams illustrating exemplary market clearing scenarios.

The first example market clearing scenario is shown in graph 1300 of FIG. 13. The buyer bids have been sorted by descending price, and the seller bids have been sorted by ascending price. In this scenario, the intersection point of the buying and selling bid lines is at the edge of a buyer quantity, but not at the edge of a seller quantity. When this happens, the partially accepted seller is considered the marginal seller. In this example, the clearing price of the market is this marginal seller's bid price, and the clearing quantity is the sum of all of the buyers' quantities for which the bid was higher than the marginal seller's bid price.

In the market clearing portrayed in FIG. 13, three buyers submitted bids at or above the clearing price. Three sellers submitted bids at or below the clearing price. The three buyers accept the market clearing price and purchase their desired quantities from the market at the clearing price. The two lowest cost sellers sell their bid quantities into the market at the clearing price. The third seller becomes the marginal seller. It gets the price of the market, but the market only needs part of its bid quantity. The marginal seller will only produce a partial output, and may need to track the specific requirements of the system.

In the context of an electrical power market, the marginal seller would be the marginal generator. As the load varies a little bit over the current market interval, the marginal generator will adjust its output to match the demand of the system. Utilizing frequency as the metric for tracking, the generator could adjust its output appropriately. If the load increased, the frequency would decrease and the marginal generator would need to increase its output. If the load decreases, the frequency will increase and the marginal generator needs to reduce its output.

Figure 14:
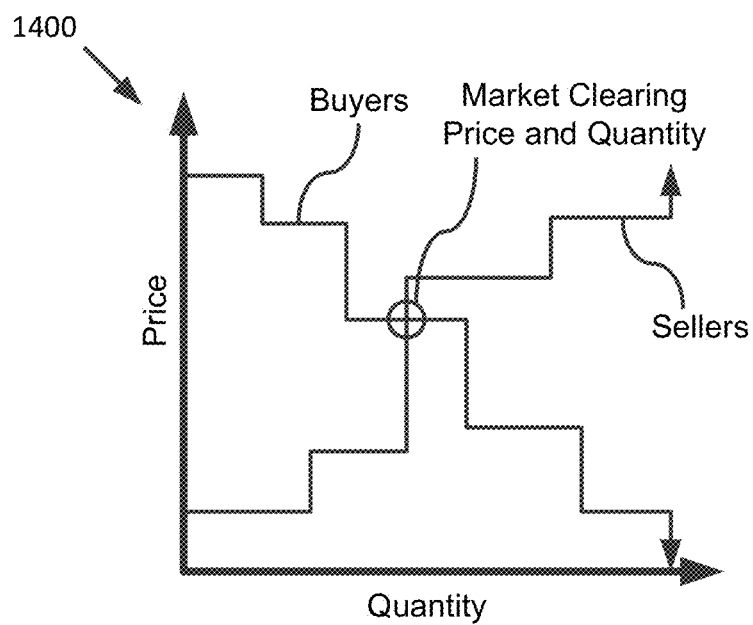

A second example market clearing scenario is shown in graph 1400 of FIG. 14. This scenario is the converse of the first scenario. Here, the buyer and seller curves intersect at an edge of a seller curve, but not at the edge of a buyer quantity. Similar to the marginal seller condition, the buyer is now referred to as the marginal buyer. The market clearing price is set at the bid price of this marginal buyer. In this example, the market clearing quantity is set to the sum of the quantities of the sellers whose bids are less than the marginal buyer's price.

As with the previous example, three buyers submitted bids at or above the clearing price. However, only two sellers submitted bids at or below the clearing price. In this example, the two sellers accept the clearing price of the market, and both sell their full quantities for the market clearing price. The first two buyers are satisfied with the market, so they buy their full desired quantity at the clearing price. The third buyer gets the price of the market, but there is not enough supply to meet its demand. As a result, a proportional response (or no response) will be necessary to meet the clearing criterion.

In the context of an electrical power market, there are a couple of possible methods for handling the marginal buyer quantity. The first method is to consider the marginal buyer to be a device capable of proportional output, like a battery charger. Rather than requiring a 100% charging rate, it will provide a proportional amount of that rate. Unfortunately, this method typically only works if the marginal quantity is a single object. If the marginal quantity is actually made up of several buyers (at the same price), this strategy becomes more difficult. For instance, if the marginal quantity is made up of several buyers, the buyers desirably regulate themselves independently such that in the aggregate they do not exceed the clear quantity. This can be done, for example, by throttling the buyers individually to the fraction of the marginal quantity actually cleared, or by using a random number (e.g., a Bernoulli distributed random number) to determine whether each unit should run during the next interval.

An alternative is to use a method similar to the marginal generator. For example, the marginal loads can all monitor the system's frequency. Utilizing a controller that monitors grid frequency and adapts in response to the frequency (e.g., a grid friendly appliance controller ("GFA")), loads can adjust accordingly. If the frequency drops, it means the marginal load is too great, so each marginal load would reduce its output. If the frequency increases, the marginal load is too small and needs to increase to balance out the fixed generation. Marginally load controlled by a GFA controller is basically the converse of the generator case.

A variation on the second marginal buyer in power systems method still utilizes a device like the GFA. However, rather than only the marginal load arming the GFA functionality, all GFAs in the system are armed. The regulation price of the system is set to the marginal clearing price. Any device that exercises its GFA functionality during this time will receive compensation at the regulation price. This method helps increase the pool of marginal load since devices below the clearing threshold may still elect to participate in this regulation market.

Figure 15:
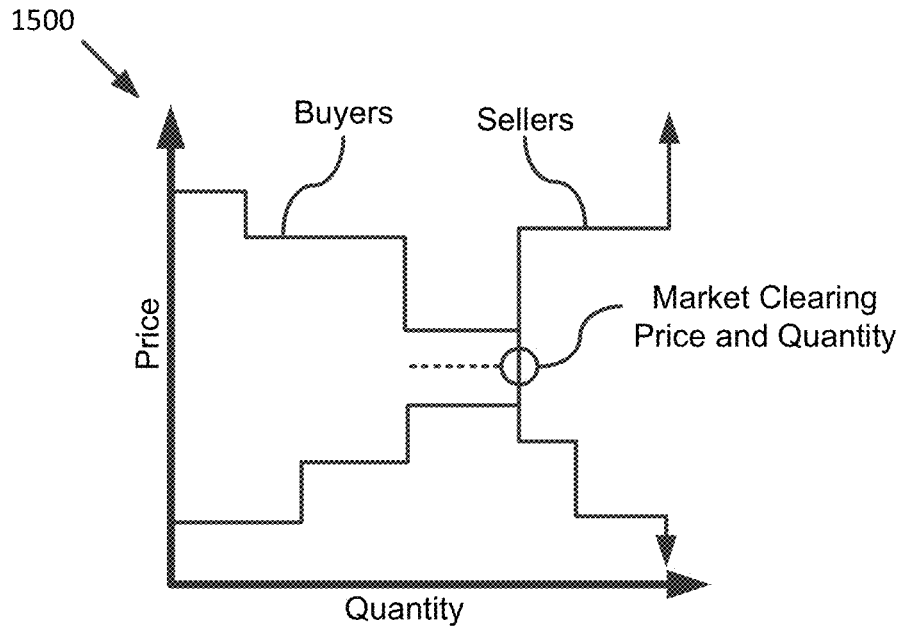

Graph 1500 of FIG. 15 represents a third market clearing example. Here, the intersection of buyer and seller curves is at the same quantity, but at different prices. The intersection point occurs on an edge of both the buyer and seller quantity curves. In this example, the quantity is set to the intersection point of the two curves. This quantity is either the sum of all sellers' quantities with a bid less than the "marginal" seller bid, or the sum of all buyers' quantities with a bid higher than the "marginal" buyer bid. However, in some embodiments, the price is desirably taken as the average price of the two intersecting bids. For example, the clearing price can be determined as:

$$Price_{Clear} = \frac{(Bid_{Seller} + Bid_{Buyer})}{2}. \tag{5}$$

In the market scenario of FIG. 15, three buyers submitted bids at or above the clearing price of the market, and three sellers submitted bids at or below the clearing price. In this case, all three buyers' and all three sellers' bidding quantities are met (since the cumulative sum of the cleared bids is the same for both buyers and sellers). Due to the unique nature of this clearing condition, a compromise is made between the lowest cleared buyer bid and highest cleared seller bid. In this example, the final clearing price is not set to either of their values, as was the case with the marginal buyer or marginal seller scenarios above. Rather, the clearing price is set as the average of the cleared buyer and seller bids. This allows both lower bid sellers and higher bid buyers to respond. However, it prevents the subsequent buyer and seller quantities from meeting the clearing price.

Figure 16:
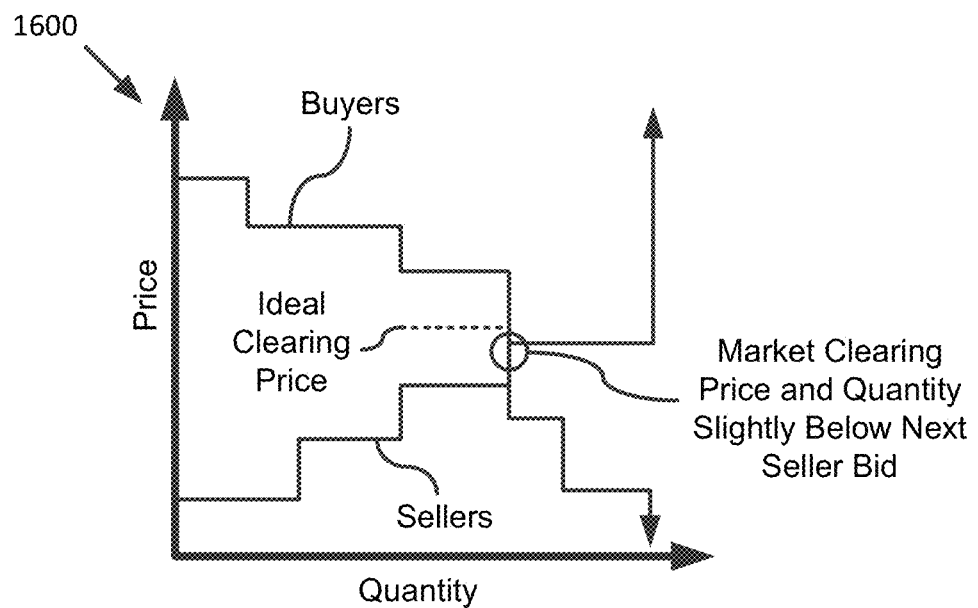
Figure 17:
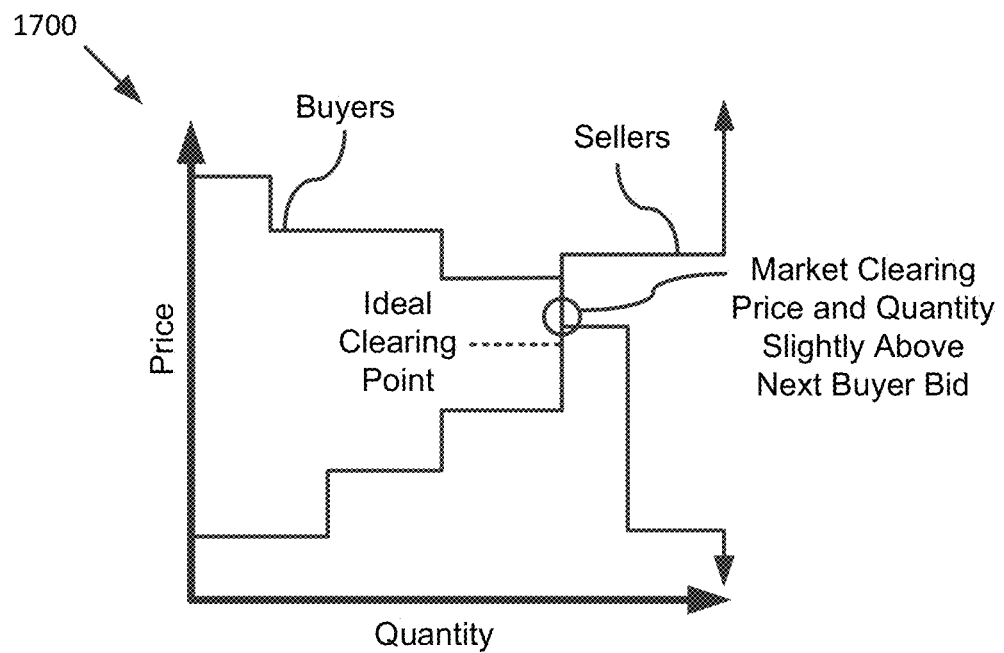

The scenario of FIG. 15 is not always as straight forward. Graph 1600 of FIG. 16 shows a scenario where the next seller bid also meets the desired clearing point. Graph 1700 of FIG. 17 shows the same scenario from a buyer perspective. In order to help ensure the proper bidders respond to the cleared market, the clearing price are desirably adjusted accordingly. For example, the final clearing price can be further constrained by the next buying and selling sorted bids. The final clearing price can be selected as the point that is closest to the ideal clearing price, but ensures the subsequent buyer and seller bids are not valid clearing conditions of the market. The maximum and minimum of this further constraint are determined by the specific bidding scenario.

In graph 1600 of FIG. 16, the next seller bid does not exceed the ideal clearing price. To ensure proper operation and that this device does not activate, the price associated with this bid is desirably above the final clearing price. This "next" bid price serves as a non-inclusive maximum for the clearing price. Therefore, the clearing price will have to be slightly below this "next" seller bid. Typically, this will be $0.01 below the next seller bid price.

Graph 1700 for FIG. 17 shows a similar behavior with buyer bids. The next buyer bid does not fall below the ideal clearing price. Therefore, this device would assume it was the marginal quantity and activate. To prevent this, the final clearing price is desirably set slightly higher than this bid. In a manner similar to the previous seller curve example, the "next" buyer bid serves as a limit for the clearing price. However, in this scenario, the "next" buyer bid serves as a non-inclusive lower limit for the market clearing price. The final clearing price of the market must then be slightly above this "next" buyer bid. Again, this may be on the order of a $0.01 increase (or other small incremental amount) above the next buyer bid.

Figure 18:
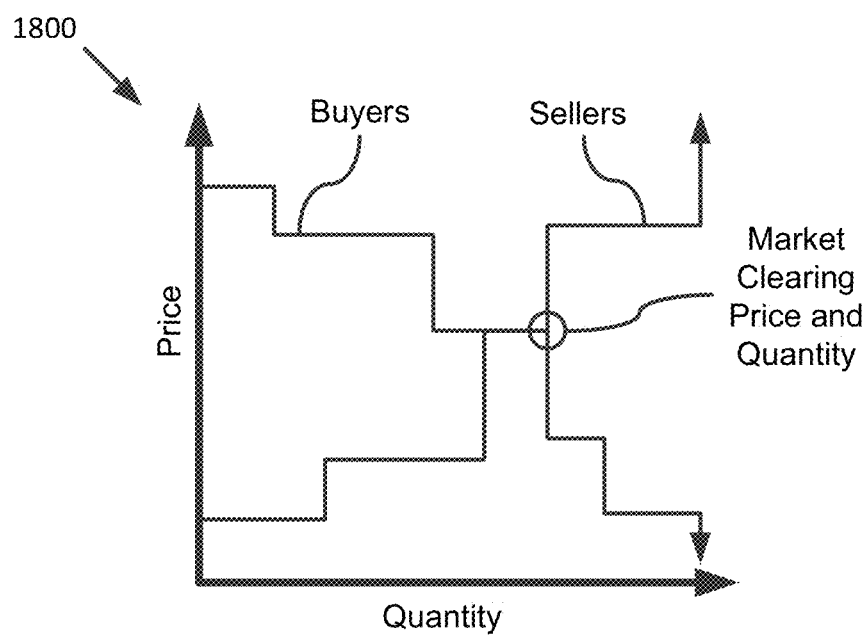

Another valid scenario is actually a variation on the scenario shown in FIG. 15. Graph 1800 of FIG. 18 is an example showing the situation when both the buyer and seller clearing quantities and clearing prices match exactly. In this case, the clearing price is the intersecting price (common for both buyer and seller). The clearing quantity is the sum of all buyers with bid prices equal to or greater than the clearing price, or the sum of all sellers with bid prices equal to or lower than the clearing price. Approaching the clearing point from either the seller or buyer curves should yield identical results.

As indicated, this scenario is a variation on the example shown in FIG. 15. Three buyers and three sellers are satisfied by the market clearing criterion. The clearing buyer and seller both agree on an exact price, so the clearing price is easy to determine. The cumulative sum of all buyers whose bid was greater than or equal to the clearing price is equivalent to the cumulative sum of all sellers whose bid was less than or equal to the clearing price.

Figure 19:
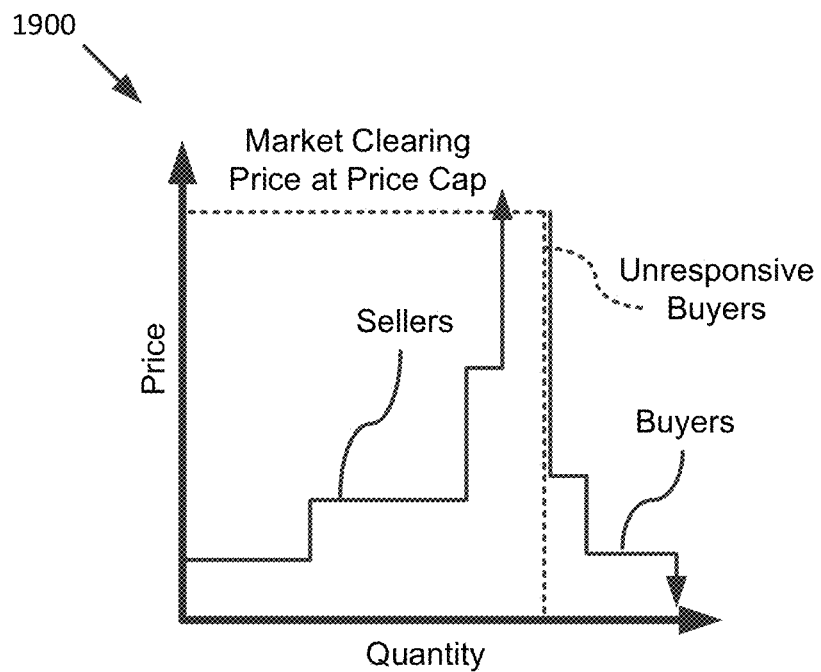

A fourth scenario for the market is for the market to fail to clear. This will happen when there is insufficient supply to meet the highest bid-price buyer. Graph 1900 of FIG. 19 provides a common example of this condition. In the full market scenario, there may be buyers on the system that are not participating in the market. These "unresponsive buyers" need to be satisfied before any bidding buyers are handled. In the market, the quantity requested by these devices (estimated or known) is bid into the market at the price cap. This ensures it is met by the seller curve before any responsive loads are considered. In an electrical power market example, these unresponsive buyers would be end-use devices that are not submitting bids into the market, or losses on the distribution system. The market must cover and serve the unresponsive loads and losses before it can handle responsive devices.

In the scenario of FIG. 19, all seller quantities fail to meet the highest buyer bid requirements (typically due to an unresponsive buyer). In such a scenario, the market simply fails to clear. The intersection point of this market will occur at the total seller quantity and the price cap. This is effectively a marginal buyer condition of FIG. 14.

Figure 20:
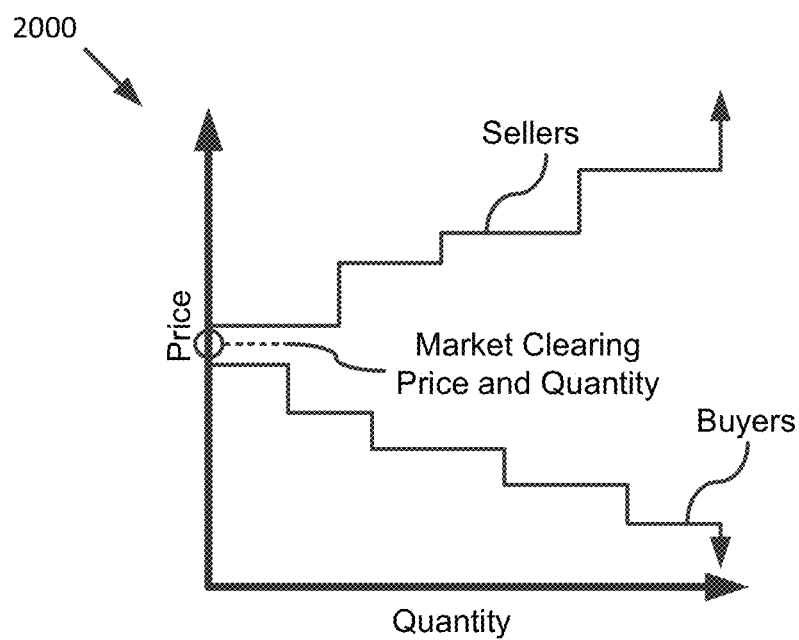
Figure 21:
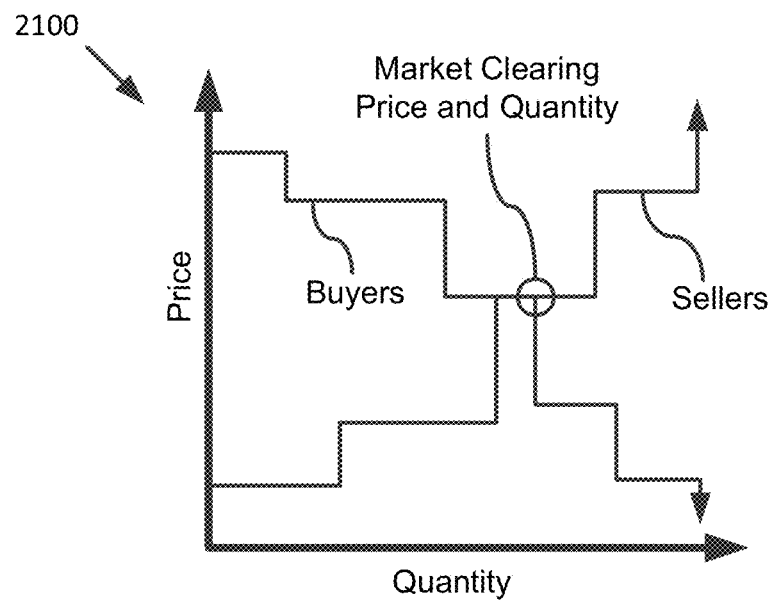

Another clearing scenario is in a similar category to the market failure of FIG. 19. On the other end of the spectrum, suppose the buyers and sellers do not agree on a bid price at all. FIG. 20 includes graph 2000 illustrating this scenario, the Null market clearing scenario. As the buyer and seller curves demonstrate, there is no intersection point for an agreeable price and quantity. The lowest priced seller is higher than the highest priced buyer.

In the null market scenario, the price poses a problem. If set to the price cap, no buyers would activate, but all sellers would activate. If set to 0 or the negative price cap, all buyers would activate, but no sellers would be present to meet the demand. A price signal to keep both parties from responding is between the highest buyer bid and the lowest seller bid. A variation on the equation from the third scenario above is to compute an average price, given as:

$$Price_{Clear} = \frac{(Bid_{LowestSeller} + Bid_{HighestBuyer})}{2} \quad (6)$$

The resulting price is higher than any buyer, so no buyers will be activated. The price is lower than any seller, so none of the sellers will be activated. The market desirably includes an overall indicator that indicates a market clearing failure. However, by setting the price to a value that satisfies neither buyers nor sellers in the market, responses to a failed market should be mitigated.

According to certain embodiments of the disclosed technology, the market can only clear in one of these scenarios. Some more complex clearing situations can occur, but they are typically related to the base cases introduced above. Graph 2100 in FIG. 21 demonstrates a variation on the marginal seller case of FIG. 13. Despite the intersecting bids having the same price, this scenario can be treated as identical to FIG. 13. The three highest buyer bids are satisfied by the market and these buyers purchase their desired quantities. Two sellers are below the clearing price, so they accept the market price and sell their full quantities into the system. The third seller is at the clearing price, but its full quantity is not needed. This seller gets the clearing price and acts as the marginal seller in the market. It will only provide part of its full output, and may need to track the buyer demand around that output point.

Figure 22:
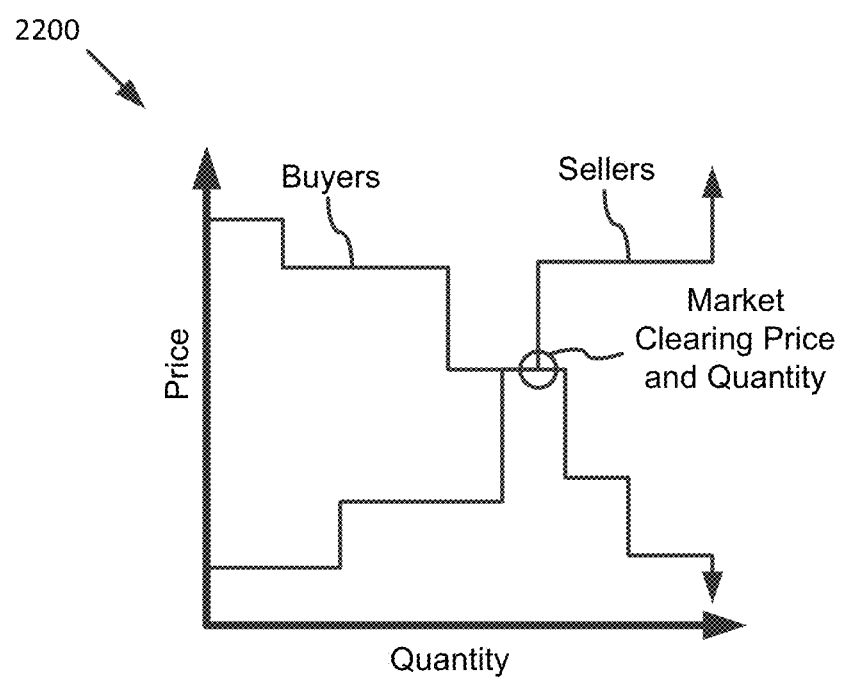

Graph 2200 in FIG. 22 shows a similar example where the clearing price is again clear. However, the quantities once again do not properly align. This case is merely a special case of the scenario presented in FIG. 14, or a marginal buyer scenario. The clearing price of the market is clear. Only the sellers with bids at or below the clearing price accept the market clearing value, and only buyers with bids at or higher than the clearing price accept the cleared market. Unfortunately, there is more demand from the buyers than there is supply from the sellers. As such, the buyer with the market clearing bid will not be able to have their full bid quantity satisfied. This buyer will consume only the appropriate portion of their bid quantity.

Figure 23:
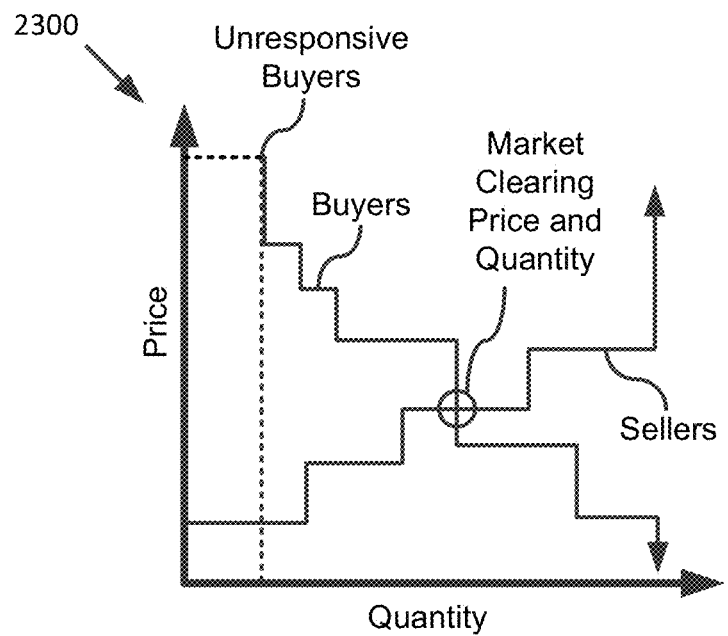

If the capability for unresponsive buyers is included, that scenario desirably factors into the market clearing as well. Once the unresponsive load quantity is known or estimated, it is bid into the market as a buyer quantity with a large price (e.g., the price cap). Graph 2300 of FIG. 23 shows how unresponsive buyers fit into the "five bidder, four seller" example for the four valid market clearing scenarios. The unresponsive buyers effectively become a bidding quantity that is always met first. Only once the needs of these unresponsive buyers are satisfied, will responsive buyer devices be able to interact with the market. If the needs of the unresponsive buyers are greater than the seller supply, the market failure case of FIG. 19 will occur.

Figure 24:
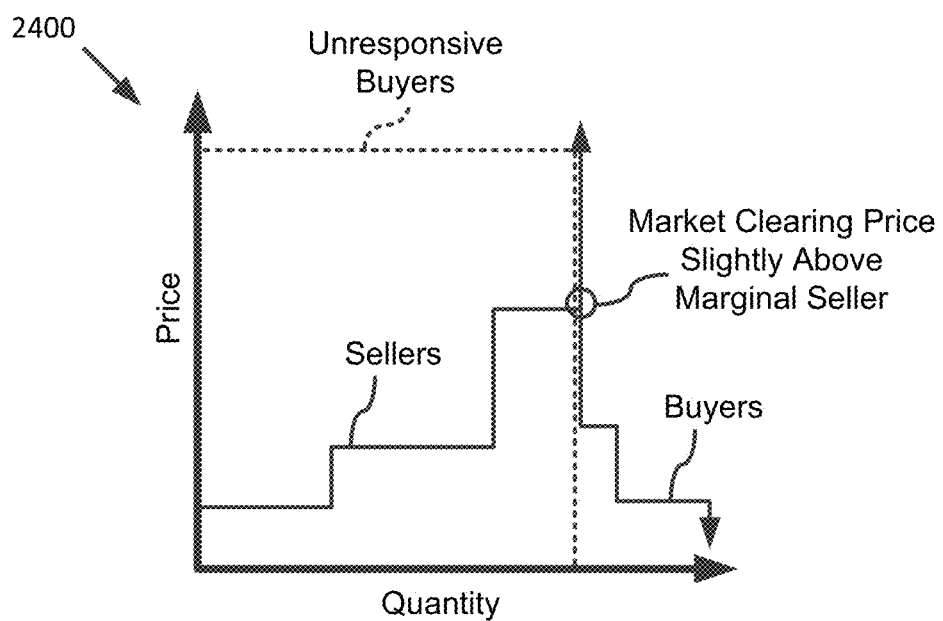

A variation on FIG. 23 and FIG. 19 occurs between the two conditions. A case in which the available seller quantities only meet the unresponsive bidder demand is illustrated in graph 2400 of FIG. 24. Desirably, the clearing price in this scenario would be the price cap of the system. This would enable all of the seller quantities, and only the unresponsive bidder quantity. However, such a "price cap bid" is typically significantly larger than other bids on the system. Under such a scenario, this bid would severely skew the output statistics on the market. To prevent this large skew, the clearing price is adjusted slightly. Similar to the conditions in FIG. 16 and FIG. 17, the final clearing price desirably still ensures all sellers are producing, but only the unresponsive buyers are consuming. As such, the marginal seller's price becomes the non-inclusive lower limit of the clearing price. The clearing price will then be set slightly above this price. This will help ensure that all sellers on the system are activated, but no responsive buyers meet the price criterion.

IV. Detailed Exemplary Implementations of the Resource Allocation Scheme Using Dispatched Values from Futures Markets The following are examples of end-use and distributed resource control techniques that can be used in the general resource allocation scheme described above in Section III and illustrated in FIG. 3.

A. Two-Way, Transactive Control for Thermostatically-Controlled Equipment

The techniques introduced in this section can be applied to transactive controllers for thermostatically controlled equipment. The transactive controllers are capable of transmitting bids to the resource allocation system. For illustrative purposes, the control is assumed to be for space or water heating and cooling (e.g., in residential or commercial buildings). The approach can be extended to other contexts as well (e.g., refrigerator; dish washer; washing machine; dryer; oven; microwave oven; pump; home lighting system; electrical charger; electric vehicle charger; home electrical system; or any other electrical system having variable performance states).

In one exemplary embodiment, thermostatically controlled heating and cooling modifies conventional controls by explicitly using market information obtained through interaction with a resource allocation system, such as any of the resource allocation systems introduced above in Section II and III. In particular, the exemplary embodiment uses bid and dispatched index value information. In the discussion below, bids and dispatched index values are sometimes referred to in terms of a cost or price. It is to be understood that this "cost" or "price" can represent an actual monetary cost or price, or an index value in terms of the relevant resource allocation index. Furthermore, the dispatched index value from the resource allocation system is sometimes referred to herein as the "clearing price".

Figure 12:
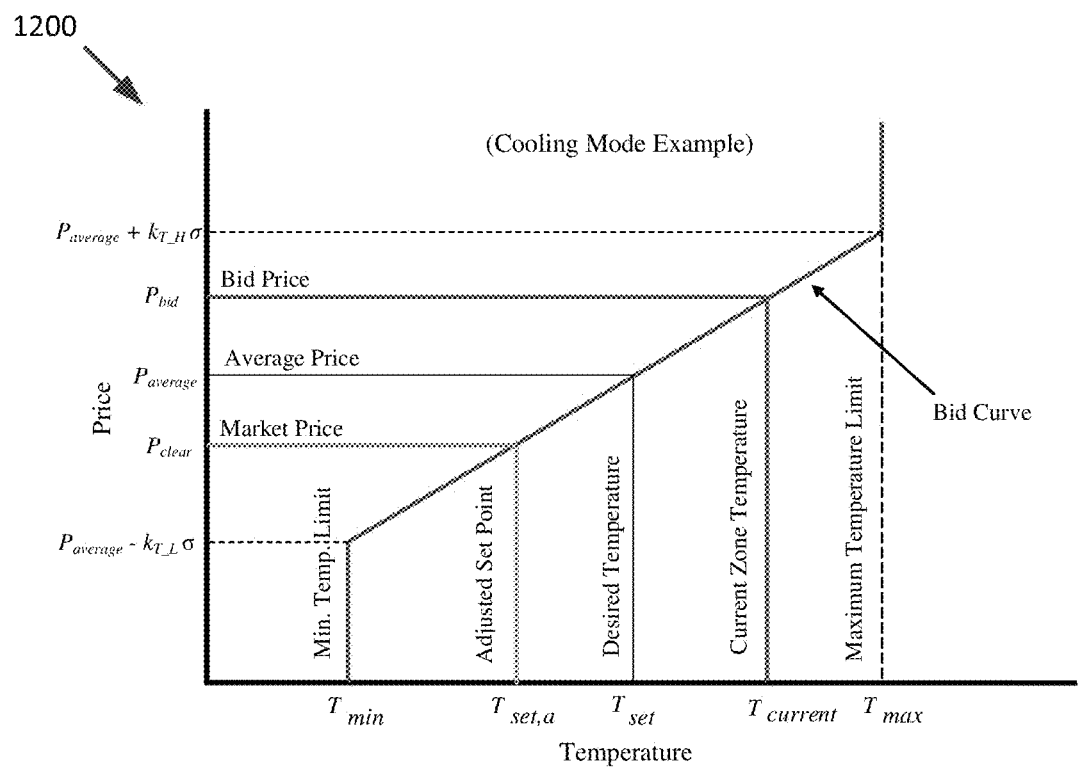
FIG. 12 is a diagram illustrating a bid and response strategy for thermostatically controlled loads according to one exemplary embodiment of the disclosed technology.

A bid curve can be used to functionally relate the cost of a service to a user's comfort. FIG. 12 shows a diagram 1200 of an exemplary bid curve that graphically illustrates several of the concepts embodied in the bidding technique described below. The exemplary bid curve in diagram 1200 is derived from the mean and standard deviation of dispatched values from a futures market (e.g., dispatched values of a day-ahead market for electricity over a 24-hour period) along with exemplary minimum and maximum temperature limits that result from a comfort setting selected by a user. Desirably, the standard deviation and average of the dispatched values from the futures markets are continually evaluated and updated (e.g., periodically as new dispatched values become available).

In the exemplary technique described below, the occupant of a locale or zone that is thermostatically controlled (the user, in this example) provides one or more inputs. For instance, the occupant selects a preferred temperature setting $T_{set}$ for each scheduled occupancy period. For each occupancy period, the occupant also selects one or more comfort settings from among a set of alternatives. In one exemplary embodiment, a comfort setting is associated with pairings of elasticity factors and temperature limits (in the illustrated example: $k_{T\_L}$, $T_{min}$ and $k_{T\_H}$, $T_{max}$), such as those listed in Table 1, or any combination thereof. In other embodiments, the temperature limits $T_{min}$ and $T_{max}$ can be individually selected by the user, and the values $k_{T\_L}$ and $k_{T\_H}$ can be derived from the selected values. In still other embodiments, the elasticity factors can also be individually selected by the user.

$k_{T\_H}$ are not necessarily identical for the upper and lower parts of the bid curve. Further, in this example, if both $k_{T\_H}$ and $k_{T\_L}$ are sufficiently (or infinitely) large, the thermostat will function like a normal thermostat unaffected by grid conditions and the behaviors of the market. With such a configuration, the thermostat is said to be inelastic.

The example shown in FIG. 12 is one in which it is desired to cool the current temperature (e.g., it is an example in which electrical resources are to be used for air conditioning). In the example, a high value of $k_{T\_H}$ will lead to relatively high bids when the zone temperature exceeds the desired zone temperature $T_{set}$, which a high bid will help make sure that the zone cooling bid will win the right to become satisfied. If $k_{T\_L}$ and $k_{T\_H}$ are small (representing elastic behavior), bids from the thermostatically controlled load deviate little from the mean price, and current temperatures are permitted to vary throughout a relatively large temperature range (from $T_{min}$ to $T_{max}$) as the market's cleared price changes.

The following discussion describes one exemplary technique for computing a bid value for a current market interval or next upcoming market interval. In the exemplary technique, the current indoor zone temperature $T_{current}$ can be determined and the consequent bid price $P_{bid}$ computed. According to the exemplary technique, the bid price is based on the slope of the bid curve and the difference between the current zone temperature $T_{current}$ and the desired zone temperature set point $T_{set}$. The corresponding bid price depends on additional parameters that are determined from the user's one or more selected comfort settings and that are indicative of the user's willingness to tolerate differences in temperature from the desired temperature setting. In this example, the additional parameters comprise $k_{T\_L}$, $k_{T\_H}$, $T_{max}$ and $T_{min}$. The bid price $P_{bid}$ is also based at least in part on an average price. In certain embodiments, the average price $P_{average}$ is based at least in part on one or more values indicative of

TABLE 1

Exemplary Comfort Settings

| One-way Controller | Thermostatic 2-Way Controller Comfort | Cooling | | Heating | |
|---|---|---|---|---|---|
| Comfort settings | $k_W$ Setting | $k_{T\_L}/k_{T\_H}$ | Tmin/Tmax | $k_{T\_L}/k_{T\_H}$ | Tmin/Tmax |
| maximum economy | 2.0 maximum economy | 1/1 | 0/10[b] | 1/1 | −10/0[b] |
| balanced economy | 1.5 balanced economy | 2/2 | 0/10 | 2/2 | −10/0 |
| balanced | 1.0 comfortable economy | 3/3 | 0/10 | 3/3 | −10/0 |
| balanced comfort | 0.5 economical comfort | 1/1 | 0/5 | 1/1 | −5/0 |
| maximum comfort | 0.0 balanced comfort | 2/2 | 0/5 | 2/2 | −5/0 |
| | maximum comfort | 3/3 | 0/5 | 3/3 | −5/0 |
| | maximum economy[a] | 1/1 | −3/10 | 1/1 | −10/3 |
| | balanced economy[a] | 2/2 | −3/10 | 2/2 | −10/3 |
| | comfortable | 3/3 | −3/10 | 3/3 | −10/3 |
| | economical comfort[a] | 1/1 | −3/5 | 1/1 | −5/3 |
| | balanced comfort[a] | 2/2 | −3/5 | 2/2 | −5/3 |
| | maximum comfort[a] | 3/3 | −3/5 | 3/3 | −5/3 |
| | no price reaction | ∞/∞ | 0/0 | ∞/∞ | 0/0 |

[a] with pre-heat and pre-cool option.
[b] $T_{min}$ and $T_{max}$ are expressed as ° F. above or below the present In the example illustrated by diagram 700 in FIG. 7, the high-temperature limit $T_{max}$ corresponds to $k_{T\_H}$ standard deviations from the mean price. Furthermore, in this example, the value $k_{T\_H}$ is automatically determined with the user's selected comfort setting (e.g., using a look-up table or file storing the elasticity factors and temperature limits associated with each comfort setting, or computing the values upon user selection of the temperature limits). The values of $k_{T\_L}$ and dispatched levels from a futures market. In particular embodiments, the following equation can be used:

$$P_{bid} = P_{average} + (T_{current} - T_{set}) \frac{k_T \times \sigma_{actual}}{|T_{limit} - T_{set}|} \quad (7)$$

where $P_{bid}$ is the bid price, $P_{average}$ is the average price of electricity over a set interval and can be computed using one of the methods described below in Section IV (the value $P_{average}$ is sometimes also referred to as the "expected price" since it indicates a likely price), $\sigma_{actual}$ is the standard deviation of the electricity price for the same period and can be computed using one of the methods described below in Section IV, $k_T$ is one of $k_{T\_L}$ or $k_{T\_H}$ depending on where $T_{current}$ presently resides on the bid curve, and $T_{limit}$ is one of $T_{min}$ or $T_{max}$, depending on where $T_{current}$ presently resides on the bid curve. For example, if $T_{current}$ is above $T_{set}$ then $k_T$ is $k_{T\_L}$ and $T_{limit}$ is $T_{min}$, but if $T_{current}$ is below $T_{set}$ then $k_T$ is $k_{T\_H}$ and $T_{limit}$ is $T_{max}$. The use of an average price based on recent dispatched values (e.g., recently dispatched values from a futures market) and a recent standard deviation enables the technique to automatically adapt and scale a bid value so that it is competitive in the present market while meeting the consumer's objective with respect to comfort and economy.

The resulting bid value can then be posted to the market (e.g., the resulting bid value can be transmitted to the one or more of central computers responsible for determining the clearing price in the local resource allocation system). The market then establishes the market clearing price using this and the other bids and offers, as has been described in Section III. Depending on how the resource allocation system is implemented, the market can be cleared externally (e.g., by a resource distributor that is external to the entity placing the bid and that operates the central computers used to determine the dispatch price (e.g., using the exemplary method shown in FIG. 6) or internally (e.g., by a resource distributor that is internal to the entity placing the bid).

After receiving the resulting posted market clearing price, an adjusted zone set point $T_{set,a}$ can be calculated. For example, in one exemplary embodiment, the following equation can be used:

$$T_{set,a} = T_{set} + (P_{clear} - P_{average}) \frac{|T_{limit} - T_{set}|}{k_T \times \sigma_{actual}} \quad (8)$$

where $P_{clear}$ is the posted market clearing price (or dispatched price), $P_{average}$ is the average price of electricity over a set interval and can be computed using one of the methods described below in Section V, $\sigma_{actual}$ is the standard deviation of the electricity price for the same period and can be computed using one of the methods described below in Section V, $k_T$ is one of $k_{T\_L}$ or $k_{T\_H}$ depending on where $T_{current}$ presently resides on the bid curve, and $T_{limit}$ is one of $T_{min}$ or $T_{max}$, depending on where $T_{current}$ presently resides on the bid curve as described above.

A graphical interpretation of the adjusted set point $T_{set,a}$ is shown in diagram 1200 of FIG. 12. The thermostat's zone set point can be adjusted to the new adjusted zone set point. Once the set point is adjusted, the thermostat's conventional control takes over.

In diagram 1200 of FIG. 12, the adjusted cooling set point falls below the current temperature $T_{current}$, meaning that there presently exists an opportunity to cool the given space at an acceptable energy cost. This process continues for each market clearing cycle. The notion of a single zone temperature set point no longer exists because the set point can be affected by the market as well as a user's selected comfort setting. Note that $T_{set,a}$ can be higher or lower than the desired set point $T_{set}$ based on the market clearing price. In cooling mode, lowering the adjusted set point $T_{set}$ below the desired set point will increase the energy consumption as one takes advantage of low energy costs.

In general, transactive control can support more aggressive pre-cooling and pre-heating functions. (For example, lowering the set point below what would normally be comfortable is done to pre-cool.) For some dynamic rate structures (e.g., time-of-use), the future price is known a priori; however, in the case of real-time pricing, the future price is unknown or highly uncertain. To pre-heat or pre-cool with real-time pricing, one should have the ability to forecast future prices. In certain embodiments, prices from futures markets are used (as shown, for example, in Section V below) thus creating greater opportunity for pre-cooling and pre-heating.

B. Demand Response On/Off Control for Equipment with One-Way Communication

This section describes techniques that can be used to control equipment that is not capable of computing and transmitting bids to the resource allocation system but that nonetheless can benefit from adaptive control strategies. Controllers using such techniques are sometimes referred to as "active controllers." The exemplary techniques are described in the context of controlling a water heater, though the techniques can be applied to a wide variety of electrical devices in which one-way communication is used (e.g., pool pumps, battery chargers, and the like). These devices having one-way communication capability can be adapted to opportunistically respond to market prices without having to formulate and submit any bids.

According to one exemplary embodiment, a probability function can be used to control whether the electrical device should run during a given time interval. For instance, the probability function can be used to grant the electrical device (e.g., a water heater) a probabilistic opportunity to run that is dependent on the relative magnitude of a cleared market price.

For example, in one particular implementation, control of the electrical device is modified so that the signal activating the device is interrupted with increasing likelihood as the clearing price exceeds the average electricity price (e.g., the average price as computed below in Section V). The greater the difference between the clearing price and the average price, the more likely the electrical device (e.g., the water heater circuit) will be interrupted.

In certain implementations, the user of the electrical device having one-way communications can select one or more comfort settings from among multiple possible comfort settings. In one example, a comfort setting is associated with a consequent weighting factor (in the exemplary implementation, the $k_W$ factor), which either attenuates or amplifies the effect of the probability function.

A variety of probability functions can be used to control the electrical device, but in one particular embodiment, the following equation is used:

$$r = k_W \left[ \frac{1}{\sqrt{2\pi}\, \sigma_{actual}} \int_{-\infty}^{P_{clear}} e^{-\frac{(P_{average}-x)^2}{2\sigma_{actual}^2}} dx - \frac{1}{2} \right] \quad (9)$$

$$= k_W [N(P_{clear}, P_{average}, \sigma_{actual}) - 0.5];$$

$$r \geq 0$$

$$r = 0;\ \text{otherwise}$$

where $P_{clear}$ is the posted market clearing price (or dispatched price), $P_{average}$ is the average price of electricity over a set interval and can be computed using one of the methods described below in Section V, $\sigma_{actual}$ is the standard deviation of the electricity price for the same period and can be computed using one of the methods described below in Section V, N is the cumulative normal distribution, and the factor $k_W$ is defined through the user's selection of one or more comfort settings.

In certain embodiments, the probability parameter r can then be used to test the probability of turning the electrical device off by comparing it to a uniformly generated random number between 0 and 1. For instance, if r is greater than this random number, the electrical device can be curtailed. The random number can be generated at each time interval to give each water heater an opportunity to run a fraction of the overall time that is proportional to the curtailment probability.

C. Transactive Control System Bid/Response Strategy for Electric Vehicle Chargers This section introduces exemplary methods for controlling chargers (e.g., electric vehicle chargers) in a resource allocation system according to the disclosed technology. For instance, some of the disclosed methods can be used in a two-way communication system, where the computing hardware associated with the charger generates bids for transmission to the resource allocation. Other methods can be used in a one-way communication system, where the computing hardware associated with the charger responds to market prices and selectively activates and deactivates the charger.

In certain embodiments of the disclosed technology, electric vehicle chargers (a) increase or decrease their bids in accordance with a user's comfort economy setting (e.g., a user-selected value, referred to herein as the k-value) in relation to the state-of-charge (SOC) and time remaining to desire full-charge, and/or (b) reduce or increase the rate-of-charge (ROC) based on the price cleared from the market.

In one exemplary implementation, the active bid strategy for an electric vehicle charger is based on the SOC, and the bid price is computed using the following:

$$P_{bid} = P_{average} - k\sigma_{actual}SOC_{dev} \qquad (10)$$

where $P_{average}$ is the average price of electricity over a set time interval and can be computed using one of the methods described below in Section V, $\sigma_{actual}$ is the standard deviation of the electricity price for the same period and can be computed using one of the methods described below in Section V, and $SOC_{dev}$ is the fractional deviation of the SOC from a desired SOC ($SOC_{des}$) with respect to minimum and maximum limits ($SOC_{min}$ and $SOC_{max}$) set by the user (e.g., $SOC_{dev}=3(SOC_{des}-SOC_{obs})/(SOC_{des}-SOC_{max})$ or $SOC_{dev}=3(SOC_{des}-SOC_{obs})/(SOC_{min}-SOC_{des})$). In operation, and according to one exemplary embodiment, the charger can be controlled so that it is turned on when the clearing price $P_{clear}$ is less than or equal to $P_{bid}$ and turned off when the clearing price exceeds the bid price.

In embodiments in which only one-way communication is possible and bidding is not possible, then a passive control strategy can be used. For example, in one particular embodiment, a strategy can be used that alters the rate of charge as a function of price. One exemplary computation uses the following equation:

$$ROC_{set} = ROC_{des}(1 - kP_{dev}) \qquad (11)$$

where $ROC_{des}$ is the desired rate-of-charge, such that $$ROC_{des} = \frac{(SOC_{final} - SOC_{obs})}{n_{hours}},$$

k is the user's comfort economy setting, with $0 < k < \infty$, $P_{dev}$ is the price deviation, such that $$P_{dev} = \frac{P_{clear} - P_{average}}{\sigma_{actual}},$$

$SOC_{final}$ is the final desired state-of-charge of the vehicle, $SOC_{obs}$ is the current observed state-of-charge of the vehicle, and $n_{hours}$ is the number of hours remaining before the $SOC_{final}$ must be achieved.

V. Determining the Average Price and the Standard Deviation Using Dispatched Prices from Futures Markets In this section, exemplary techniques for computing some of the parameters used in determining a demand bid and used in determining a device's response to the dispatched price are described. In particular, this section describes different methods of determining the average price $P_{average}$ of electricity, the clearing price $P_{clear}$ and the standard deviation $\sigma_{actual}$ of the electricity price for the same period. The methods described below use price information from a futures market (e.g., a day-ahead market) and/or price information from the local real-time market. By using price information from the futures market, two-way and one-way controllers can react less dramatically to volatility that may be present in the real-time market. However, it may be desirable to include some component from the real-time market in order for two-way and one-way controllers to react to a dramatic but persistent change in the price in the real-time market.

In the examples described below, the price information is determined from wholesale prices and prices from a day-ahead market. For instance, the local resource allocation market can be operated by a local distribution network operator at the distribution feeder level. Further, the local distribution network operator can operate the local resource allocation market as a capacity management market as described above in Section III.L. The local distribution network operator can receive wholesale price information and day-ahead prices from a regional distributor, which itself is a supplier to the local distribution network operator (and may be the main or only supplier to the local distribution feeder operator by the local distribution operator). The local distribution operator may include one or more markups to the wholesale price or to the day-ahead price (e.g., a linear markup and/or a flat markup) before transmitting the price information to the transactive and active controllers in the local resource allocation market. In certain implementations, the local distribution operator network communicates with the resource consumers, resource suppliers, and the regional distributor using a network topology such as the one shown in FIG. 2.

In the examples described below, the wholesale price information is cleared at 5 minute intervals, though any interval could be used. Also, in the examples, the day-ahead price information is cleared at 1 hour intervals, though any interval could be used.

The following parameters are used in the examples below. W is the wholesale price of electricity distributed to the local distribution feeder (e.g., from a regional distributor). In the examples described below, the wholesale price information is assumed to be determined at 5 minute intervals, though any interval could be used. $RTP_W$ is the real-time price transmitted to customers. In the examples described below, $RTP_W = a(W) + b$ where a and b are markup parameters. As shown, a is a linear parameter and b is a flat parameter. $\overline{RTP_W}$ is the average of the real-time price $RTP_W$. In the examples described below, the average $\overline{RTP_W}$ is determined from the real-time prices $RTP_W$ from a rolling window comprising the previous 3 hours (a 3-hour rolling window of 36 values). Although a rolling window of 3 hours is used, a rolling window of any duration could be used. $\sigma_W$ is the standard deviation of the real-time price $RTP_W$ from the window used to determine the average $\overline{RTP_W}$. DA is the day-ahead price. In the examples described below, the day-ahead price $RTP_{DA}$ is the day-ahead price for the current hour but one day ahead and is determined at one-hour intervals, though any interval could be used. Further, any futures prices could be used (e.g., two-day-ahead prices, week-ahead, or any other cleared price for future delivery of electricity). $RTP_{DA}$ is the real-time day-ahead price transmitted to customers. In the examples described below, $RTP_{DA}$=a'(DA)+b' where a' and b' are markup parameters. As shown, a' is a linear parameter and b' is a flat parameter. $\overline{RTP_{DA}}$ is the average of the day-ahead price $RTP_{DA}$. In the examples described below, the average $\overline{RTP_{DA}}$ is determined from the day-ahead prices $RTP_{DA}$ from a fixed or blocked window comprising a 24-hour window for the next day (a 24-hour window of 24 values that transitions at a specific time each day (e.g., midnight)). Although a fixed window of 24 hours is used, a fixed or rolling window of any duration could be used. $\sigma_{DA}$ is the standard deviation of the day-ahead prices $RTP_{DA}$ from the window used to determine the average $\overline{RTP_{DA}}$.

Furthermore, $\upsilon_{actual}$ is the number of standard deviations of the current price from the given expected price for a given pricing scheme, examples of which are described in the subsections below. Depending on the pricing scheme, and as more fully explained below, either $\overline{RTP_W}$, $\overline{RTP_{DA}}$, or both $\overline{RTP_W}$ and $\overline{RTP_{DA}}$ are used as the average (or expected) price $P_{average}$ in Equations (7)-(11) above (or other bidding formula or control formula); either $RTP_W$, $RTP_{DA}$, or both $RTP_W$ and $RTP_{DA}$ are used as the cleared price $P_{clear}$ in Equations (7)-(11) above (or other bidding formula or control formula); and either $\sigma_{DA}$, $\sigma_W$, or both $\sigma_{DA}$ and $\sigma_W$ are used as the standard deviation value of $\sigma_{actual}$ in Equations (7)-(11) (or other bidding formula or control formula).

A. Pricing Scheme Using Day-Ahead Prices

In one embodiment, the values $P_{clear}$, $P_{average}$, and $\sigma_{actual}$ used in Equations (7)-(11) above (or other bidding formula or control formula) are based on the day-ahead prices DA. In one exemplary implementation, $RTP_{DA}$ is used as the cleared price $P_{clear}$, $\overline{RTP_{DA}}$ is used as the average price $P_{average}$, and $\sigma_{DA}$ is used as the standard deviation $\sigma_{actual}$.

Thus, in one exemplary implementation of this embodiment, the bid price computation of Equation (7) becomes:

$$P_{bid} = \overline{RTP_{DA}} + (T_{current} - T_{set}) \frac{k_T \times \sigma_{DA}}{|T_{limit} - T_{set}|}. \quad (12)$$

The adjusted zone set point computation of Equation (8) becomes:

$$T_{set,a} = T_{set} + (RTP_{DA} - \overline{RTP_{DA}}) \frac{|T_{limit} - T_{set}|}{k_T \times \sigma_{DA}}. \quad (13)$$

Further, this equation can be rewritten as:

$$T_{set,a} = T_{set} + \upsilon_{actual} \frac{|T_{limit} - T_{set}|}{k_T}, \quad (14)$$

where $\upsilon_{actual}$ is computed as follows:

$$\upsilon_{actual} = \frac{RTP_{DA} - \overline{RTP_{DA}}}{\sigma_{DA}} \quad (15)$$

Additionally, the computation of Equation (9) for the probability parameter used with one-way active controllers becomes:

$$r = k_W \left[ \frac{1}{\sqrt{2\pi}\,\sigma_{DA}} \int_{-\infty}^{RTP_{DA}} e^{\frac{(RTP_{DA}-x)^2}{2\sigma_{DA}^2}} dx - \frac{1}{2} \right] \quad (16)$$

$$= k_W [N(RTP_{DA}, \overline{RTP_{DA}}, \sigma_{DA}) - 0.5];$$

$$r \geq 0$$

$r = 0$; otherwise

The electric vehicle charger bid price computation of Equation (10) becomes:

$$P_{bid} = RTP_{DA} - k\,\sigma_{DA} SOC_{dev}. \quad (17)$$

Further, the electric vehicle rate of charge computation of Equation (11) and used for one-way active controllers becomes:

$$ROC_{set} = ROC_{des}\left(1 - k\left(\frac{RTP_{DA} - \overline{RTP_{DA}}}{\sigma_{DA}}\right)\right) \quad (18)$$

$$= ROC_{des}(1 - k\upsilon_{actual}),$$

where $\upsilon_{actual}$ is computed as in Equation (15).

In particular implementations, the values $RTP_{DA}$, $\overline{RTP_{DA}}$ and $\sigma_{DA}$ are updated according to the interval at which the day-ahead prices are updated (e.g., one hour intervals). In some implementations, the local resource allocation market uses the price $RTP_{DA}$ or a linear extrapolation of $RTP_{DA}$ (e.g., $RTP_{DA}$(a)+b) as the posted market clearing price $P_{clear}$. In other implementations, only the value $\sigma_{actual}$ is based on the day-ahead prices DA (by using $\sigma_{DA}$).

B. Pricing Scheme Using Blend of Day-Ahead Prices and Wholesale Prices

In another embodiment, the cleared price $P_{clear}$ used in Equations (7)-(11) above (or other bidding formula or control formula) is based on the wholesale price whereas the average price $P_{average}$ and the standard deviation value $\sigma_{actual}$ is based on day-ahead $\overline{RTP_{DA}}$ is used as the average price $P_{average}$, and $\sigma_{DA}$ is used as the standard deviation $\sigma_{actual}$.

Thus, in one exemplary implementation of this embodiment, the bid price computation of Equation (7) becomes:

$$P_{bid} = \overline{RTP_{DA}} + (T_{current} - T_{set}) \frac{k_T \times \sigma_{DA}}{|T_{limit} - T_{set}|}. \quad (19)$$

The adjusted zone set point computation of Equation (8) becomes:

$$T_{set,a} = T_{set} + (RTP_W - \overline{RTP_{DA}}) \frac{|T_{limit} - T_{set}|}{k_T \times \sigma_{DA}}. \quad (20)$$

Further, this equation can be rewritten as:

$$T_{set,a} = T_{set} + \upsilon_{actual} \frac{|T_{limit} - T_{set}|}{k_T}, \quad (21)$$

where $\upsilon_{actual}$ is computed as follows:

$$\upsilon_{actual} = \frac{RTP_W - \overline{RTP_{DA}}}{\sigma_{DA}} \quad (22)$$

Additionally, the computation of Equation (9) for the probability parameter used with one-way active controllers becomes:

$$r = k_W \left[ \frac{1}{\sqrt{2\pi}\,\sigma_{DA}} \int_{-\infty}^{RTP_W} e^{-\frac{(\overline{RTP_{DA}}-x)^2}{2\sigma_{DA}^2}}\,dx - \frac{1}{2} \right] \quad (23)$$

$$= k_W [N(RTP_W, \overline{RTP_{DA}}, \sigma_{DA}) - 0.5];$$

$$r \geq 0$$

$r = 0$; otherwise

The electric vehicle charger bid price computation of Equation (10) becomes:

$$P_{bid} = RTP_W - k\sigma_{DA} SOC_{dev}. \quad (24)$$

Further, the electric vehicle rate of charge computation of Equation (11) and used for one-way active controllers becomes:

$$ROC_{set} = ROC_{des}\left(1 - k\left(\frac{RTP_W - \overline{RTP_{DA}}}{\sigma_{DA}}\right)\right) \quad (25)$$

$$= ROC_{des}(1 - k\upsilon_{actual})$$

In particular implementations, the values $RTP_W$, $\overline{RTP_{DA}}$ and $\sigma_{DA}$ are updated according to the interval at which the wholesale prices are updated (e.g., five-minute intervals). In some implementations, only the value $\sigma_{actual}$ is computed as above (by using $\sigma_{DA}$).

C. Pricing Scheme Using Wholesale Prices

In another embodiment, the values $P_{clear}$, $P_{average}$, and $\sigma_{actual}$ used in Equations (7)-(11) above (or other bidding formula or control formula) are based only on the wholesale prices W. In one exemplary implementation, $RTP_W$ is used as the cleared price $P_{clear}$, $\overline{RTP_W}$ is used as the average price $P_{average}$, and the value $\sigma_W$ is used as the standard deviation $\sigma_{actual}$.

Thus, in one exemplary implementation of this embodiment, the bid price computation of Equation (7) becomes:

$$P_{bid} = \overline{RTP_W} + (T_{current} - T_{set})\frac{k_T \times \sigma_W}{|T_{limit} - T_{set}|}. \quad (26)$$

The adjusted zone set point computation of Equation (8) becomes:

$$T_{set,a} = T_{set} + (RTP_W - \overline{RTP_W})\frac{|T_{limit} - T_{set}|}{k_T \times \sigma_W}. \quad (27)$$

Further, this equation can be rewritten as:

$$T_{set,a} = T_{set} + \upsilon_{actual}\frac{|T_{limit} - T_{set}|}{k_T}, \quad (28)$$

where $\upsilon_{actual}$ is computed as follows:

$$\upsilon_{actual} = \frac{RTP_W - \overline{RTP_W}}{\sigma_W} \quad (29)$$

Additionally, the computation of Equation (9) for the probability parameter used with one-way active controllers becomes:

$$r = k_W \left[ \frac{1}{\sqrt{2\pi}\,\sigma_W} \int_{-\infty}^{RTP_W} e^{-\frac{(\overline{RTP_W}-x)^2}{2\sigma_W^2}}\,dx - \frac{1}{2} \right] \quad (30)$$

$$= k_W [N(RTP_W, \overline{RTP_W}, \sigma_W) - 0.5];$$

$$r \geq 0$$

$r = 0$; otherwise

The electric vehicle charger bid price computation of Equation (10) becomes:

$$P_{bid} = RTP_W - k\sigma_W SOC_{dev}. \quad (31)$$

Further, the electric vehicle rate of charge computation of Equation (11) and used for one-way active controllers becomes:

$$ROC_{set} = ROC_{des}\left(1 - k\left(\frac{RTP_W - \overline{RTP_W}}{\sigma_W}\right)\right) \quad (32)$$

$$= ROC_{des}(1 - k\upsilon_{actual})$$

In particular implementations, the values $RTP_W$, $\overline{RTP_W}$, and $\sigma_W$ are updated according to the interval at which the wholesale prices are updated (e.g., five-minute intervals). In some implementations, only the value $\sigma_{actual}$ is computed as above (by using $\sigma_W$).

D. Pricing Scheme Using Weighted Contribution of Wholesale Prices and Day-Ahead Prices In another embodiment, the values $P_{clear}$, $P_{average}$, and $\sigma_{actual}$ used in Equations (7)-(11) above (or other bidding formula or control formula) are based on a weighted sum that allows both the wholesale prices W and the day-ahead prices DA to contribute.

In one particular embodiment, the local resource allocation market uses the following as the posted market clearing price $P_{clear}$:

$$P_{clear} = a(RTP_W) + (1-a)(RTP_{DA}). \quad (33)$$

Further, in this embodiment, the local resource allocation market uses the following as the price $P_{average}$:

$$P_{average} = a(\overline{RTP_W}) + (1-a)(\overline{RTP_{DA}}). \quad (34)$$

Additionally, in this embodiment, the local resource allocation market uses the following as the standard deviation $\sigma_{actual}$:

$$\sigma_{actual} = \sqrt{a^2\sigma_W^2 + 2a(1-a)\sigma_W\sigma_{DA} + (1-a)^2\sigma_{DA}^2} \quad (35)$$

In Equations (33) through (35) (as well as the equations below), a specifies a weighting fraction of the wholesale price versus the day-ahead price and comprises a value between 0 and 1.

Thus, in one exemplary implementation of this embodiment, the bid price computation of Equation (7) becomes:

$$P_{bid} = (a(\overline{RTP_W}) + (1-a)(\overline{RTP_{DA}})) + (T_{current} - T_{set})\frac{k_T \times \sigma_{actual}}{|T_{limit} - T_{set}|}, \quad (36)$$

where $\sigma_{actual}$ is computed as in Equation (35).

The adjusted zone set point computation of Equation (8) becomes:

$$T_{set,a} = \qquad (37)$$
$$T_{set}((a(RTP_W) + (1-a)(RTP_{DA})) - (a(\overline{RTP_W}) + (1-a)(\overline{RTP_{DA}})))$$
$$\frac{|T_{limit} - T_{set}|}{k_T \times \sigma_{actual}},$$

where $\sigma_{actual}$ is computed as in Equation (35). Further, Equation (37) can be rewritten as:

$$T_{set,a} = T_{set} + \upsilon_{actual} \frac{|T_{limit} - T_{set}|}{k_T}, \qquad (38)$$

where $\upsilon_{actual}$ is computed as follows:

$$\upsilon_{actual} = \frac{a(RTP_W - \overline{RTP_W}) + (1-a)(RTP_{DA} - \overline{RTP_{DA}})}{\sqrt{a^2 \sigma_W^2 + 2a(1-a)\sigma_W \sigma_{DA} + (1-a)^2 \sigma_{DA}^2}} \qquad (39)$$

Additionally, the computation of Equation (9) for the probability parameter used with one-way active controllers becomes:

$$r = k_W \left[ \frac{1}{\sqrt{2\pi}\,\sigma_{actual}} \int_{-\infty}^{a(RTP_W)+(1-a)(RTP_{DA})} e^{-\frac{((a(\overline{RTP_W})+(1-a)(\overline{RTP_{DA}}))-x)^2}{2\sigma_{actual}^2}} dx - \frac{1}{2} \right] \qquad (40)$$

$$= k_W [N((a(RTP_W) + (1-a)(RTP_{DA})), (a(\overline{RTP_W}) + (1-a)(\overline{RTP_{DA}})), \sigma_{actual}) - 0.5];$$

$$r \geq 0$$

$$r = 0; \text{ otherwise}$$

The electric vehicle charger bid price computation of Equation (10) becomes:

$$P_{bid} = (a(\text{RTP}_W) + (1-a)(\text{RTP}_{DA})) - k\sigma_{actual} \text{SOC}_{dev}. \qquad (41)$$

where $\sigma_{actual}$ is computed as in Equation (35).

Further, the electric vehicle rate of charge computation of Equation (11) and used for one-way active controllers becomes:

$$ROC_{set} = ROC_{des}\left(1 - k\left(\frac{a(RTP_W - \overline{RTP_W}) + (1-a)(RTP_{DA} - \overline{RTP_{DA}})}{\sqrt{a^2 \sigma_W^2 + 2a(1-a)\sigma_W \sigma_{DA} + (1-a)^2 \sigma_{DA}^2}}\right)\right) \qquad (42)$$

$$= ROC_{des}(1 - k\upsilon_{actual})$$

Further, in certain implementations, the components of Equation (33)-(42) are updated at different intervals. For instance, the components related to real-time wholesale prices W can be updated on 5-minute intervals and the components related to day-ahead prices DA can be updated on one-hour intervals. In some implementations, only the standard deviation $\sigma_{actual}$ is computed as above (by using $\sqrt{a^2 \sigma_W^2 + 2a(1-a)\sigma_W \sigma_{DA} + (1-a)^2 \sigma_{DA}^2}$).

In some implementations, the value of a is not constant, but varies. For example, the value of a can change depending on a current state of the local distribution feeder. For instance, as the local distribution feeder approaches capacity (e.g., during critical or peak periods of time), the weighting function a can change so that the real-time prices are favored (e.g., the influence of the real-time prices become the major contributor to Equation (9)), thus making the controllers more sensitive to volatility in the market and responsive to sudden price changes that might occur as a result of the capacity of the feeder being reached. Similarly, the weighting function a can change so that the day-ahead prices are favored during off-critical or non-peak periods of time (e.g., the influence of the day-ahead prices become the major contributor to Equation (9)), thus making the controllers less sensitive to volatility in the market. In some instances, the weighting value a switches between relatively extreme values (e.g., 0 and 1), effectively operating as a switch between two or more different pricing schemes.

VI. Concluding Remarks

Having described and illustrated the principles of the disclosed technology in the detailed description and accompanying drawings, it will be recognized that the various embodiments can be modified in arrangement and detail without departing from such principles.

For example, it is to be understood that any of the features and embodiments described herein can be used in combination with any of the features and embodiments described in U.S. Provisional Application No. 61/194,596 filed on Sep. 29, 2008, and entitled "METHOD AND SYSTEM FOR ELECTRIC POWER GRID CONTROL"; U.S. Nonprovisional application Ser. No. 12/587,008, filed on Sep. 29, 2009, and entitled "ELECTRIC POWER GRID CONTROL USING A MARKET-BASED RESOURCE ALLOCATION SYSTEM" (published as U.S. Patent Application Publication No. 2010/0114387); U.S. Nonprovisional application Ser. No. 12/587,009, filed on Sep. 29, 2009, and entitled "USING BI-DIRECTIONAL COMMUNICATIONS IN A MARKET-BASED RESOURCE ALLOCATION SYSTEM" (published as U.S. Patent Application Publication No. 2010/0106332); U.S. Nonprovisional application Ser. No. 12/587,006, filed on Sep. 29, 2009, and entitled "USING ONE-WAY COMMUNICATIONS IN A MARKET-BASED RESOURCE ALLOCATION SYSTEM" (published as U.S. Patent Application Publication No. 2010/0106641); U.S. Nonprovisional application Ser. No. 12/587,000, filed on Sep. 29, 2009, and entitled "DISTRIBUTING RESOURCES IN A MARKET-BASED RESOURCE ALLOCATION SYSTEM" (published as U.S. Patent Application Publication No. 2010/0107173); U.S. Provisional Application No. 61/143,954 filed on Jan. 12, 2009, and entitled "NESTED, HIERARCHICAL RESOURCE ALLOCATION SCHEMA FOR MANAGEMENT AND CONTROL OF AN ELECTRIC POWER GRID"; U.S. Nonprovisional application Ser. No. 12/686,243, filed on Jan. 12, 2010, and entitled "NESTED, HIERARCHICAL RESOURCE ALLOCATION SCHEMA FOR MANAGEMENT AND CONTROL OF AN ELECTRIC POWER GRID," (published as U.S. Patent Application Publication No. 2010/0179862); and U.S. Nonprovisional application Ser. No. 13/096,770, filed on Apr. 28, 2011 concurrently herewith, and entitled "PREVENTING CONFLICTS AMONG BID CURVES USED WITH TRANSACTIVE CONTROLLERS IN A MARKET-BASED RESOURCE ALLOCATION SYSTEM," all of which are hereby incorporated herein by reference.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims and their equivalents. We therefore claim as our invention all that comes within the scope and spirit of these claims.

What is claimed is:

1. A method of operating a resource allocation system, comprising:
   by computing hardware associated with the resource allocation system, receiving a plurality of requests for electricity from a plurality of device controllers associated with a respective plurality of responsive end-use electrical devices, wherein each of the requests indicates a requested quantity of electricity, a device-requested index value indicative of a maximum price a respective end-use electrical device will pay for the requested quantity of electricity, and an indication of whether the respective end-use electrical device is currently operating and thereby consuming electricity from the resource allocation system;
   by the computing hardware, computing a responsive load currently experienced in the resource allocation system by summing the requested quantities of electricity from a plurality of the responsive end-use electrical devices that also are currently operating;
   by the computing hardware, computing an unresponsive load in the resource allocation system by computing a difference between the responsive load and a total load currently experienced by the resource allocation system, wherein the unresponsive load is associated with unresponsive end-use electrical devices that are currently operating and thereby consuming electricity from the resource allocation system; and
   altering the responsive load in the resource allocation system by transmitting a dispatched index value to the plurality of device controllers and causing the device controllers to adjust the electricity consumption of the associated responsive end-use electrical devices in response to the dispatched index value.

2. The method of claim 1, further comprising:
   using computing hardware, determining a dispatched index value at which electricity is to be supplied based at least in part on the device-requested index values and the unresponsive load.

3. The method of claim 2, wherein the dispatched index value is determined using an auction process, and wherein the method further comprises submitting the unresponsive load as a request for electricity having a requested quantity of electricity and a requested index value, the requested quantity of electricity corresponding to the unresponsive load.

4. The method of claim 2, wherein the requested index value for the unresponsive load is higher than all other requests for electricity.

5. The method of claim 2, wherein the requested index value for the unresponsive load is at a market price cap.

6. The method of claim 2, wherein the method further comprises receiving a plurality of offers for supplying electricity from a plurality of resource suppliers, each of the offers indicating an offered quantity of electricity and a supplier-requested index value indicative of a minimum price for which a respective supplier will produce the offered quantity of electricity, and wherein the determining the dispatched index value is based at least in part on the device-requested index values, the supplier-requested index values, and the unresponsive load.

7. The method of claim 1, wherein the acts of receiving the plurality of requests for electricity, computing the responsive load, and computing the unresponsive load are repeated at periodic intervals.

8. The method of claim 1, further comprising transmitting the dispatched index value to at least one of the end-use electrical devices.

9. One or more non-transitory computer-readable media storing computer-executable instructions which when executed by a computer cause the computer to perform a method of operating a resource allocation system, the method comprising:
   receiving a plurality of requests for electricity from a plurality of device controllers associated with a plurality of responsive end-use electrical devices, wherein each of the requests indicates a requested quantity of electricity, a device-requested index value indicative of a maximum price a respective end-use electrical device will pay for the requested quantity of electricity, and an indication of whether the respective end-use electrical device is currently operating and thereby consuming electricity from the resource allocation system;
   computing a responsive load currently experienced in the resource allocation system by summing the requested quantities of electricity from a plurality of the responsive end-use electrical devices that also are currently operating;
   computing an unresponsive load in the resource allocation system by computing a difference between the responsive load and a total load currently experienced by the resource allocation system, wherein the unresponsive load is associated with unresponsive end-use electrical devices that are currently operating and thereby consuming electricity from the resource allocation system; and
   altering the responsive load in the resource allocation system by transmitting a dispatched index value to the plurality of device controllers and causing the device controllers to adjust the electricity consumption of the associated responsive end-use electrical devices in response to the dispatched index value.

10. A system comprising memory and a processor programmed to perform a method of operating a resource allocation system, the method comprising:
   receiving a plurality of requests for electricity from a plurality of device controllers associated with a plurality of responsive end-use electrical devices, wherein each of the requests indicates a requested quantity of electricity, a device-requested index value indicative of a maximum price a respective end-use electrical device will pay for the requested quantity of electricity, and an indication of whether the respective end-use electrical device is currently operating and thereby consuming electricity from the resource allocation system;

computing a responsive load currently experienced in the resource allocation system by summing the requested quantities of electricity from a plurality of the electrical devices that also are currently operating;

computing an unresponsive load in the resource allocation system by computing a difference between the responsive load and a total load currently experienced by the resource allocation system, wherein the unresponsive load is associated with unresponsive end-use electrical devices that are currently operating and thereby consuming electricity from the resource allocation system; and altering the responsive load in the resource allocation system by transmitting a dispatched index value to the plurality of device controllers and causing the device controllers to adjust the electricity consumption of the associated responsive end-use electrical devices in response to the dispatched index value.

11. The computer-readable media of claim 9, wherein the method further comprises determining a dispatched index value at which electricity is to be supplied based at least in part on the device-requested index values and the unresponsive load.

12. The computer-readable media of claim 11, wherein the dispatched index value is determined using an auction process, and wherein the method further comprises submitting the unresponsive load as a request for electricity having a requested quantity of electricity and a requested index value, the requested quantity of electricity corresponding to the unresponsive load.

13. The computer-readable media of claim 11, wherein the requested index value for the unresponsive load is higher than all other requests for electricity.

14. The computer-readable media of claim 11, wherein the requested index value for the unresponsive load is at a market price cap.

15. The computer-readable media of claim 11, wherein the method further comprises receiving a plurality of offers for supplying electricity from a plurality of resource suppliers, each of the offers indicating an offered quantity of electricity and a supplier-requested index value indicative of a minimum price for which a respective supplier will produce the offered quantity of electricity, and wherein the determining the dispatched index value is based at least in part on the device-requested index values, the supplier-requested index values, and the unresponsive load.

16. The computer-readable media of claim 9, wherein the acts of receiving the plurality of requests for electricity, computing the responsive load, and computing the unresponsive load are repeated at periodic intervals.

17. The computer-readable media of claim 9, wherein the method further comprises transmitting the dispatched index value to at least one of the end-use electrical devices.

\* \* \* \* \*